United States Patent Office 3,344,083
Patented Sept. 26, 1967

3,344,083
PROCESS OF BREAKING EMULSIONS
Woodrow J. Dickson, La Habra, and Fred W. Jenkins, Buena Park, Calif., assignors to Petrolite Corporation, a corporation of Delaware
No Drawing. Division of application Ser. No. 47,387, Aug. 4, 1960. Continuation of application Ser. No. 115,877, June 9, 1961. This application Mar. 4, 1966, Ser. No. 531,793
6 Claims. (Cl. 252—344)

This application is a division of application Serial No. 47,387, filed on Aug. 4, 1960, and is copending with application Serial No. 458,373, filed on May 24, 1965, now abandoned, as a division of said application Serial No. 458,373, and is also a continuation of application Serial No. 115,877, filed on June 9, 1961, now abandoned and is copending with each of the following applications:
(1) Ser. No. 505,037, Oct. 24, 1965, Fuel Composition; (2) Ser. No. 115,876, June 9, 1961, Process of Preventing Scale, granted as U.S. Patent No. 3,251,778 on May 17, 1966; (3) Ser. No. 505,039, Oct. 24, 1965, Preventing Corrosion, granted as U.S. Patent No. 3,262,791 on July 26, 1966; (4) Ser. No. 115,878, June 9, 1961, Lubricating Composition, now Patent No. 3,301,783; (5) Ser. No. 115,881, June 9, 1961, Inhibiting Foam, now abandoned; (6) Ser. No. 115,882, June 9, 1961, Flotation Process, now abandoned; (7) Ser. No. 115,883, June 9, 1961, Drilling Fluids, now abandoned; (8) Ser. No. 115,884, June 9, 1961, Treatment of Oil Wells, now abandoned; (9) Ser. No. 308,063, Sept. 11, 1963, Anti-Stripping Agents, granted as U.S. Patent No. 3,259,513 on July 5, 1966.

This invention relates to polyalkyleneimines and to derivatives thereof. More particularly, this invention relates to polyethyleneimine and to polyethyleneimine derivatives containing various groups, such as the oxyalkylated, acylated, alkylated, carbonylated, olefinated, etc., derivatives thereof, prepared by introducing such groups individually, alternately, in combination, etc., including for example, derivatives prepared by varying the order of adding such groups, by increasing the number and order of adding such groups, and the like.

This invention also relates to methods of using these products, which have an unexpectedly broad spectrum of uses, for example, as demulsifiers for water-in-oil emulsions; as demulsifiers for oil-in-water emulsions; as corrosion inhibitors; as fuel oil additives for gasoline, diesel fuel, jet fuel, and the like, as lubricating oil additives; as scale preventatives; as chelating agents or to form chelates which are themselves useful, for example, as anti-oxidants, gasoline stabilizers, fungicides, etc.; as flotation agents, for example, as flotation collection agents; as asphalt additives or anti-stripping agents for asphalt-mineral aggregate compositions; as additives for compositions useful in acidizing calcareous stratas of oil wells; as additives for treating water used in the secondary recovery of oil and in disposal wells; as additives used in treating oil well strata in primary oil recovery to enhance the flow of oil; as emulsifiers for both oil-in-water and water-in-oil emulsions; as additives for slushing oils; as additives for cutting oils; as additives for oil to prevent emulsification during transport; as additives for drilling muds; as agents useful in removing mud sheaths from newly drilled wells; as dehazing or "fog-inhibiting" agents for fuels; as additives for preparing sand or mineral slurries useful in treating oil wells to enhance the recovery of oil; as agents for producing polymeric emulsions useful in preparing water-vapor impermeable paper board; as agents in paraffin solvents; as agents in preparing thickened silica aerogel lubricants; as gasoline additives to remove copper therefrom; as de-icing and anti-stalling agents for gasoline; as antiseptic, preservative, bactericidal, bacteriostatic, germicidal, fungicidal agents; as agents for the textile industry, for example, as mercerizing assistants, as wetting agents, as rewetting agents, as dispersing agents, as detergents, as penetrating agents, as softening agents, as dyeing assistants, as anti-static agents, and the like; as additives for rubber latices; as entraining agents for concrete and cements; as anti-static agents for rugs, floors, upholstery, plastic and wax polishes, textiles, etc.; as detergents useful in metal cleaners, in floor oils, in dry cleaning, in general cleaning, and the like; as agents useful in leather processes such as in flat liquoring, pickling, acid degreasing, dye fixing, and the like; as agents in metal pickling; as additives in paints for improved adhesion of primers, in preventing water-spotting in lacquer; as anti-skinners for pigment flushing, grinding and dispersing, as antifeathering agents in ink; as agents in the preparation of wood pulp and pulp slurries, as emulsifiers for insecticidal compositions and agricultural sprays such as DDT, 24-D (Toxaphene), chlordane, nicotine sulfate, hexachloracyclohexane, and the like; as agents useful in building materials, for example, in the water repellent treatment of plaster, concrete, cement, roofing materials, floor sealers; as additives in bonding agents for various insulating building materials; and the like.

Polyalkyleneimine employed in this invention include high molecular weight polyethyleneimine, i.e. polymers of ethyleneimine,

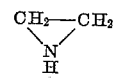

or substituted products thereof:

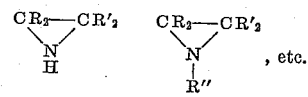

wherein R, R' and R" are hydrogen or a substituted group, for example a hydrocarbon group such as alkyl, cycloalkyl, aryl, aralkyl, alkaryl, etc., but preferably hydrogen or alkyl.

Thus, polyethyleneimine is polymerized, substituted or an unsubstituted, 1,2-alkyleneimine. Although polyethyleneimine is the preferred embodiment, other illustrative examples include, for example,

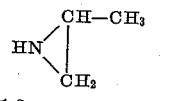
1,2-propyleneimine

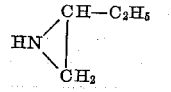
1,2-butyleneimine

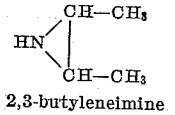
2,3-butyleneimine

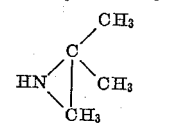
1,1-dimethylethylimine

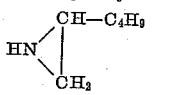

C-butylethyleneimine

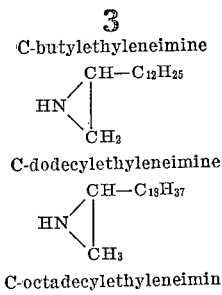

C-octadecylethyleneimine

A preferred class of polymerized 1,2 alkyleneimines include those derived from polymerizing

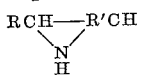

wherein R and R' are hydrogen or an alkyl radical, the latter being the same or different. Of the substituted ethyleneimines, propyleneimines are preferred.

The polyethyleneimines useful herein have molecular weights of, for example, at least 800, for example from 800 to 100,000 or higher, but preferably 20,000 to 75,000 or higher. There is no upper limit to the molecular weight of the polymer employed herein and molecular weights of 200,000, 500,000 or 1,000,000 or more can be employed.

The optimum molecular weight will depend on the particular derivative, the particular use, etc.

Although these products are generally prepared by polymerizing 1,2 alkyleneimines, they may also be prepared by other known methods, for example, by decarboxylating 2-oxazolidine as described in 2,806,839, etc.

Commercial examples of these compounds are available, for example, those sold by the Chemirad Corporation as "PEI" in a 50% by weight aqueous solution having a molecular weight of 30–40,000. Propyleneimine is also commercially available and suitable polymers can be prepared from this material.

For convenience and simplicity, this invention will be illustrated by employing polyethyleneimine.

Polyethyleneimine is a well known polymer whose preparation from ethyleneimine is described in U.S. Patent 2,182,306 and elsewhere. For convenience in polymerizing and handling, the polymer is generally prepared as an aqueous solution. Water can be removed, if desired, by distilling the water therefrom or by azeotroping the water therefrom in the presence of a hydrocarbon, such as xylene, and using the solution and/or suspension obtained thereby for further reaction or use. The following polyethyleneimines of the molecular weights indicated are employed herein to illustrate this invention.

Polymer designation:
| Polyethyleneimine— | Aprox. mol. wgt. range |
| --- | --- |
| 900 | 800–1000 |
| 5,000 | 4000–6000 |
| 11,500 | 10,500–12,500 |
| 20,000 | 18,000–22,000 |
| 35,000 | 30,000–40,000 |
| 50,000 | 40,000–60,000 |
| 75,000 | 65,000–85,000 |
| 100,000 | 80,000–125,000 |

ACYLATION

A wide variety of acrylating agents can be employed. Acylation is carried out under dehydrating conditions, i.e., water is removed. Any of the well-known methods of acylation can be employed. For example, heat alone, heat and reduced pressure, heat in combination with an azeotroping agent, etc., are all satisfactory.

The temperature at which reaction between the acylating agent and polyethyleneimine is effected is not too critical a factor. Since the reactions involved appear to be an amide-formation reaction and a condensation reaction, the general temperature conditions for such reactions, which are well known to those skilled in the art, are applicable.

Acylation is conducted at a temperature sufficiently high to eliminate water and below the pyrolytic point of the reactants and the reaction products. In general, the reaction is carried out at a temperature of from 120° to 280° C., but preferably at 140° to 200° C.

The product formed on acylation will vary with the particular conditions employed. First the salt, then the amide is formed. If, however, after forming the amide at a temperature between 140°–250° C., but usually not above 200° C., one heats such products at a higher range, approximately 250–280° C., or higher, possibly up to 300° C. for a suitable period of time, for example, 1–2 hours or longer, one can in many cases recover a second mole of water for each mole of carboxylic acid group employed, the first mole of water being evolved during amidification. The product formed in such cases contains a cyclic amidine ring, such as an imidazoline or a tetrahydropyrimidine ring. Infrared analysis is a convenient method of determining the presence of these groups.

Water is formed as a by-product of the reaction between the acylating agent and polyethyleneimine. In order to facilitate the removal of this water, to effect a more complete reaction in accordance with the principle of LeChatelier, a hydrocarbon solvent which forms an azeotropic mixture with water can be added to the reaction mixture. Heating is continued with the liquid reaction mixture at the preferred reaction temperature, until the removal of water by azeotropic distillation has substantially ceased. In general, any hydrocarbon solvent which forms an azeotropic mixture with water can be used. It is preferred, however, to use an aromatic hydrocarbon solvent of the benzene series. Non-limiting examples of the preferred solvent are benzene, toluene, and xylene. The amount of solvent used is a variable and non-critical factor. It is dependent on the size of the reaction vessel and the reaction temperature selected. Accordingly, a sufficient amount of solvent must be used to support the azeotropic distillation, but a large excess must be avoided since the reaction temperature will be lowered thereby. Water produced by the reaction can also be removed by operating under reduced pressure. When operating with a reaction vessel equipped with a reflux condenser provided with a water takeoff trap, sufficient reduced pressure can be achieved by applying a slight vacuum to the upper end of the condenser. The pressure inside the system is usually reduced to between about 50 and about 300 millimeters. If desired, the water can be removed also by distillation, while operating under relatively high temperature conditions.

The time of reaction between the acylating agent and polyethyleneimine is dependent on the weight of the charge, the reaction temperature selected, and the means employed for removing the water from the reaction mixture. In practice, the reaction is continued until the formation of water has substantially ceased. In general, the time of reaction will vary between about 4 hours and about ten hours.

Although a wide variety of carboxylic acids produce excellent products, carboxylic acids having more than six carbon atoms and less than 40 carbon atoms but preferably 8–30 carbon atoms give most advantageous products. The most common examples include the detergent forming acids, i.e., those acids which combine with alkalies to produce soap or soap-like bodies. The detergent-forming acids, in turn, include naturally-occurring fatty acids, resin acids, such as abietic acid, naturally-occurring petroleum acids, such as naphthenic acids, and carboxy acids, produced by the oxidation of petroleum. As will be subsequently indicated, there are other acids which have somewhat similar characteristics and are derived from somewhat different sources and are different in structure, but can be included in the broad generic term previously indicated.

Suitable acids include straight chain and branched chain, saturated and unsaturated, aliphatic, alicyclic, fatty, aromatic, hydroaromatic, and aralkyl acids, etc.

Examples of saturated aliphatic monocarboxylic acids are acetic, propionic, butyric, valeric, caproic, heptanoic, caprylic, nonanoic, capric, undecanoic, lauric, tridecanoic, myristic, pentadecanoic, palmitic, heptadecanoic, stearic, nonadecanoic, eicosanoic, heneicosanoic, docosanoic, triconsanoic, tetracosanoic, pentacosanoic, cerotic, heptacosanoic, montanic, nonacosanoic, melissic and the like.

Examples of ethylenic unsaturated aliphatic acids are acrylic, methacrylic, crotonic, anglic, teglic, the pentenoic acids, the hexenoic acids, for example, hydrosorbic acid, the heptenoic acids, the octenoic acids, the nonenoic acids, the decenoic acids, for example, obtusilic acid, the undecenoic acids, the dodecenoic acids, for example, lauroleic, linderic, etc., the tridecenoic acids, the tetradecenoic acids, for example, myristoleic acid, the pentadecenoic acids, the hexadecenoic acids, for example, palmitoleic acid, the heptadecenoic acids, the octodecenoic acids, for example, petrosilenic acid, oleic acid, elardic acid, the nonadecenoic acids, for example the eicosenoic acids, the docosenoic acids, for example, erucic acid, brassidic acid, cetoleic acid, the tetradosenic acids, and the like.

Examples of dienoic acids are the pentadienoic acids, the hexadienoic acids, for example, sorbic acid, the octadienoic acids, for example, linoleic, and the like.

Examples of the trienoic acids are the octadecatrienoic acids, for example, linolenic acid, eleostearic acid, pseudoeleostearic acid, and the like.

Carboxylic acids containing functional groups such as hydroxy groups can be employed. Hydroxy acids, particularly the alpha hydroxy acids include glycolic acid, lactic acid, the hydroxyvaleric acids, the hydroxy caproic acids, the hydroxyheptanoic acids, the hydroxy caprylic acids, the hydroxynonanoic acids, the hydroxycapric acids, the hydroxydecanoic acids, the hydroxy lauric acids, the hydroxy tridecanoic acids, the hydroxy-myristic acids, the hydroxypentadecanoic acids, the hydroxy-palmitic acids, the hydroxyhexadecanoic acids, the hydroxyheptadecanoic acids, the hydroxy stearic acids, the hydroxyoctadecenoic acids, for example, ricinoleic acid, ricinelardic acid, hydroxyoctadecynoic acids, for example, ricinstearolic acid, the hydroxyeicosanoic acids, for example, hydroxyarachidic acid, the hydroxydocosanoic acids, for example, hydroxybehenic acid, and the like.

Examples of acetylated hydroxyacids are ricinoleyl lactic acid, acetyl ricinoleic acid, chloroacetyl ricinoleic acid, and the like.

Examples of the cyclic aliphatic carboxylic acids are those found in petroleum called naphthenic acids, hydrocarbic and chaumoogric acids, cyclopentane carboxylic acids, cyclohexanecarboxylic acid, campholic acid, fenchlolic acids, and the like.

Examples of aromatic monocarboxylic acids are benzoic acid, substituted benzoic acids, for example, the toluic acids, the xyleneic acids, alkoxy benzoic acid, phenyl benzoic acid, naphthalene carboxylic acid, and the like.

Mixed higher fatty acids derived from animal or vegetable sources, for example, lard, cocoanut oil, rapeseed oil, sesame oil, palm kernel oil, palm oil, olive oil, corn oil, cottonseed oil, sardine oil, tallow, soyabean oil, peanut oil, castor oil, seal oils, whale oil, shark oil, and other fish oils, teaseed oil, partially or completely hydrogenated animal and vegetable oils are advantageously employed. Fatty and similar acids include those derived from various waxes, such as beeswax, spermaceti, montan wax, Japan wax, coccerin and carnauba wax. Such acids include carnaubic acid, cerotic acid, lacceric acid, montanic acid, psyllastearic acid, etc. One may also employ higher molecular weight carboxylic acids derived by oxidation and other methods, such as from paraffin wax, petroleum and similar hydrocarbons; resinic and hydroaromatic acids, such as hexahydrobenzoic acid, hydrogenated naphthoic, hydrogenated carboxy diphenyl, naphthenic, and abietic acid; Twitchell fatty acids, carboxydiphenyl pyridine carboxylic acid, blown oils, blown oil fatty acids and the like.

Other suitable acids include phenylstearic acid, benzoylnonylic acid, cetyloxybutyric acid, cetyloxyacetic acid, chlorstearic acid, etc.

Examples of the polycarboxylic acids are those of the aliphatic series, for example, oxalic, malonic, succinic, glutaric, adipic, pimelic, suberic, azelaic, sebacic, nonanedicarboxylic acid, decanedicarboxylic acids, undecanedicarboxylic acids, and the like.

Examples of unsaturated aliphatic polycarboxylic acids are fumaric, maleic, mesocenic, citraconic, glutonic, itaconic, muconic, aconitic acids, and the like.

Examples of aromatic polycarboxylic acids are phthalic, isophthalic acids, terephthalic acids, substituted derivatives thereof (e.g. alkyl, chloro, alkoxy, etc. derivatives), biphenyldicarboxylic acid, diphenylether dicarboxylic acids, diphenylsulfone dicarboxylic acids and the like.

Higher aromatic polycarboxylic acids containing more than two carboxylic groups are himimellitic, trimellitic, trimesic, mellophanic, prehnitic, pyromellitic acids, mellitic acid, and the like.

Other polycarboxylic acids are the dimeric, trimeric, and polymeric acids, for example, dilinoleic, trilinoleic, and other polyacids sold by Emery Industries, and the like. Other polycarboxylic acids include those containing ether groups, for example, diglycolic acid. Mixtures of the above acids can be advantageously employed.

In addition, acid precursors such as acid anhydrides, esters, acid halides, glycerides, etc., can be employed in place of the free acid.

Examples of acid anhydrides are the alkenyl succinic acid anhydrides.

Any alkenyl succinic acid anhydride or the corresponding acid is utilizable for the production of the reaction products of the present invention. The general structural formulae of these compounds are:

Anhydride

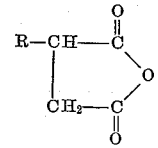

Acid

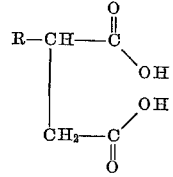

wherein R is an alkenyl radical. The alkenyl radical can be straight-chain or branched-chain; and it can be saturated at the point of unsaturation by the addition of a substance which adds to olefinic double bonds, such as hydrogen, sulfur, bromine, chlorine, or iodine. It is obvious, of course, that there must be at least two carbon atoms in the alkenyl radical, but there is no real upper limit to the number of carbon atoms therein. However, it is preferred to use an alkenyl succinic acid anhydride reactant having between about 8 and about 18 carbon atoms per alkenyl radical. Although their use is less desirable, the alkenyl succinic acids also react, in accordance with this invention, to produce satisfactory reaction products. It has been found, however, that their use necessitates the removal of water formed during the reaction and also often causes undesirable side reactions to occur to some extent. Nevertheless, the alkenyl succinic acid anhydrides and the alkenyl succinic acids are interchangeable for the purposes of the present invention. Accordingly, when the term "alkenyl succinic acid anhydride," is used herein, it must be clearly understood that it embraces the alkenyl succinic acids as well as their anhydrides, and the derivatives thereof in which the olefinic double bond has been saturated as set forth hereinbefore. Non-limiting examples of the alkenyl succinic acid anhydride reactant are ethenyl succinic acid anhydrides; ethenyl succinic acid; ethyl succinic acid anhydride; propenyl succinic acid anhydride; sulfurized propenyl succinic acid anhydride; butenyl succinic acid; 2-methylbutenyl succinic acid anhydride; 1,2-dichloropentyl succinic acid anhydride; hexenyl succinic acid anhydride; hexyl succinic acid; sulfurized 3-methylpentenyl succinic acid anhydride; 2,3-dimethylbutenyl succinic acid anhydride; 3,3-dimethylbutenyl succinic acid; 1,2-dibromo-2-ethylbutyl succinic acid; heptenyl succinic acid anhydride; 1,2-diiodooctyl succinic acid; octenyl succinic acid anhydride; 2-methyl-heptenyl succinic acid anhydride; 4-ethylhexenyl succinic acid; 2-isopropylpentenyl succinic acid anhydride; nonenyl succinic acid anhydride; 2-propylhexenyl succinic acid anhydride; decenyl succinic acid; decenyl succinic acid anhydride; 5-methyl-2-isopropylhexenyl succinic acid anhydride; 1,2-dibromo-2-ethyloctenyl succinic acid anhydride; decyl succinic acid anhydride; undecenyl succinic acid anhydride; 1,2-dichloro-undecyl succinic acid anhydride; 1,2-dichloro-undecyl succinic acid; 3-ethyl-2-t-butylpentenyl succinic acid anhydride; dodecenyl succinic acid anhydride; dodecenyl succinic acid; 2-propylnonenyl succinic acid anhydride; 3-butyloctenyl succinic acid anhydride; tridecenyl succinic acid anhydride; tetradecenyl succinic acid anhydride; hexadecenyl succinic acid anhydride; sulfurized octadecenyl succinic acid; octadecyl succinic acid anhydride; 1,2-dibrom-2-methylpentadecenyl succinic acid anhydride; 8-propylpentadecyl succinic acid anhydride; eicosenyl succinic acid anhydride; 1,2-dichloro-2-methylnonadecenyl succinic acid anhydride; 2-octyldodecenyl succinic acid; 1,2-diiodotetracosenyl succinic acid anhydride; hexacosenyl succinic acid; hexacosenyl succinic acid anhydride; and hentriacontenyl succinic acid anhydride.

The methods of preparing the alkenyl succinic acid anhydrides are well known to those familiar with the art. The most feasible method is by the reaction of an olefin with maleic acid anhydride. Since relatively pure olefins are difficult to obtain, and when thus obtainable, are often too expensive for commercial use, alkenyl succinic acid anhydrides are usually prepared as mixtures by reacting mixtures of olefins with maleic acid anhydride. Such mixtures, as well as relatively pure anhydrides, are utilizable herein.

In summary, without any intent of limiting the scope of the invention, acylation includes amidification, the formation of the cylic amidine ring, the formation of acid imides such as might occur when anhydrides such as the alkenylsuccinic acids are reacted, i.e.

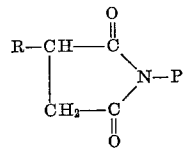

wherein P=the polyethyleneimine residue, polymers as might occur when a dicarboxylic acid is reacted intermolecularly with polyethyleneimine, cyclization as might occur when a dicarboxylic acid reacts intramolecularly with polyethyleneimine as contrasted to intermolecular reactions, etc. The reaction products may contain other substances. Accordingly, these reaction products are most accurately defined by a definition comprising a recitation of the process by which they are produced, i.e., by acylation.

The moles of acylating agent reacted with polyethyleneimine will depend on the number of acylation reactive positions contained therein as well as the number of moles of acylating agent one wishes to incorporate into the polymer. Theoretically one mole of acylating agent can be reacted per amino group on the polyethyleneimine molecule. We have advantageously reacted 1–20 moles of acylating agent per mole of polyethylene 900, but preferably 1–12 moles. Proportionately greater amounts of acylating agent can be employed with polyethyleneimine of higher molecular weight. Thus, with polyethyleneimine 20,000, 1–50 moles of acylating agent can be employed, and with polyethyleneimine 35,000, 1–100 moles can be employed, etc. Optimum acylation will depend on the particular use.

The following examples are illustrative of the preparation of the acylated polyethyleneimine.

The following general procedure is employed in acylating. A xylene suspension of polyethyleneimine, after the removal of water, is mixed with the desired ratio of acid. Heat is then applied. After the removal of the calculated amount of water (1 to 2 equivalents per carboxylic acid group of the acid employed), heating is stopped and the azeotroping agent is evaporated under vacuum. The temperature during the reaction can vary from 80° to 200° C. Where the formation of the cyclic amidine type structure is desired, the maximum temperature is generally 180–250° C. and more than one mole of water per carboxylic group is removed. The reaction times range from 4 to 24 hours. Here again, the true test of the degree of reaction is the amount of water removed.

*Example 1–$A_7$*

The reaction is carried out in a 5 liter, 3 necked flask furnished with a stirring device, thermometer, phase separating trap, condenser and heating mantle to 1 mole (900 grams) of polyethyleneimine 900 in an equal weight of xylene (i.e., 900 grams, 200 grams of lauric acid (1 mole) is added with stirring in about ten minutes. The reaction mixture is then heated gradually to about 145° C. in half an hour and then held at about 160° C. over a period of 3 hours until 19 grams (1.1 mole) of water is collected in the side of the tube. The solvent is then removed with gentle heating under reduced pressure of approximately 20 mm. The product is a dark, viscous, xylene soluble liquid.

*Example 1–$A_6$*

The prior example is repeated except that the final reaction temperature is maintained at 240° C. and 36 grams (2 moles) of water are removed instead of 19 grams (1.1 mole). Infrared analysis of the product indicates the presence of a cyclic amidine ring.

The following examples of acylated polyethyleneimines are prepared in the manner of the above examples from the polyethyleneimine noted in the following table. The products obtained are dark, viscous materials.

In the examples the symbol "A" identifies the acylated polyethyleneimine. Thus, specifically "1–A," represents acylated polyethyleneimine.

TABLE I.—ACYLATED PRODUCTS OF POLYETHYLENE IMINE

| Ex. | Acid | Molecular Weight of Polyethyleneimine (PE) | Ratio Mols of Acid Per Mol of PE | Ratio Mols of Water Removed Per Mol of Acid |
|---|---|---|---|---|
| 1–$A_1$ | Lauric (200) | 900 | 10:1 | 1.12 |
| 1–$A_2$ | do | 900 | 8:1 | 1.3 |
| 1–$A_3$ | do | 900 | 6:1 | 1.5 |
| 1–$A_4$ | do | 900 | 5:1 | 1.1 |
| 1–$A_5$ | do | 900 | 4:1 | 1.85 |
| 1–$A_6$ | do | 900 | 1:1 | 2.0 |
| 1–$A_7$ | do | 900 | 1:1 | 1.1 |
| 2–$A_1$ | Oleic (282) | 5,000 | 6:1 | 1.3 |
| 2–$A_2$ | do | 5,000 | 5:1 | 1.02 |
| 2–$A_3$ | do | 5,000 | 4:1 | 1.6 |
| 2–$A_4$ | do | 5,000 | 1:1 | 2.0 |
| 3–$A_1$ | Acetic (60) | 11,500 | 10:1 | 1.3 |
| 3–$A_2$ | do | 11,500 | 5:1 | 1.8 |
| 3–$A_3$ | do | 11,500 | 2:1 | 1.1 |

TABLE I.—Continued

| Ex. | Acid | Molecular Weight of Polyethyleneimine (PE) | Ratio Mols of Acid Per Mol of PE | Ratio Mols of Water Removed Per Mol of Acid |
|---|---|---|---|---|
| 3-A₄ | Acetic (60) | 11,500 | 1:1 | 1.2 |
| 4-A₁ | Palmitic (256.4) | 11,500 | 3:1 | 1.6 |
| 4-A₂ | ----do---- | 11,500 | 2:1 | 1.3 |
| 4-A₃ | ----do---- | 11,500 | 1:1 | 2.0 |
| 5-A₁ | Stearic (284) | 20,000 | 3:1 | 1.4 |
| 5-A₂ | ----do---- | 20,000 | 2:1 | 1.1 |
| 6-A₁ | Dimeric (600) (Emery Industries). | 20,000 | 3:1 | 1.5 |
| 6-A₂ | ----do---- | 20,000 | 2:1 | 2.0 |
| 6-A₃ | ----do---- | 20,000 | 1:1 | 1.1 |
| 6-A₄ | ----do---- | 20,000 | 1:2 | 2.0 |
| 7-A₁ | Nonanoic (158) | 50,000 | 3:1 | 1.7 |
| 7-A₂ | ----do---- | 50,000 | 2:1 | 1.6 |
| 7-A₃ | ----do---- | 50,000 | 1:1 | 1.5 |
| 8-A₁ | Myristic (228.4) | 50,000 | 3:1 | 1.1 |
| 8-A₂ | ----do---- | 50,000 | 2:1 | 1.9 |
| 8-A₃ | ----do---- | 50,000 | 1:1 | 1.3 |
| 9-A₁ | Alkenyl(C₁₂) Succinic Anhy. (266). | 50,000 | 6:1 | 1.5 |
| 9-A₂ | ----do---- | 50,000 | 4:1 | 1.6 |
| 9-A₃ | ----do---- | 50,000 | 2:1 | 1.4 |
| 10-A₁ | Naphthenic (330) (Sunaptic Acid B). | 50,000 | 2:1 | 1.8 |
| 10-A₂ | ----do---- | 50,000 | 1:1 | 1.2 |
| 11-A₁ | Maleic Anhydride (98) | 50,000 | 1:1 | |
| 11-A₂ | ----do---- | 50,000 | 0.8:1 | |
| 11-A₃ | ----do---- | 50,000 | 1:2 | |
| 12-A₁ | Oleic (282) | 100,000 | 2:1 | 1.6 |
| 12-A₂ | ----do---- | 100,000 | 1:1 | 1.4 |
| 13-A₁ | Diglycolic (134) | 100,000 | 1:1 | 1.0 |
| 13-A₂ | ----do---- | 100,000 | 1:2 | 2.0 |
| 14-A₁ | Diphenolic (286) | 100,000 | 2:1 | 1.1 |
| 14-A₂ | ----do---- | 100,000 | 1:1 | 1.1 |

The following table presents specific illustration of compounds other than polyethyleneimine and its derivatives.

TABLE I-A.—ACYLATED PRODUCTS OF POLYPROPYLENEIMINE

| Ex. | Molecular Wt. of Polypropyleneimine | Acid | Mols of Acid Per Mol of Polypropyleneimine | Mols of Water Removed Per Mol of Acid |
|---|---|---|---|---|
| 15-A₁ | 500 | Stearic (284) | 2:1 | 1.9 |
| 15-A₂ | 500 | ----do---- | 1:1 | 1.1 |
| 15-A₃ | 500 | Lauric (200) | 1:1 | 0.9 |
| 16-A₁ | 1,000 | Oleic (282) | 3:1 | 1.0 |
| 16-A₂ | 1,000 | Palmitic (256.4) | 1:1 | 1.2 |
| 16-A₃ | 1,000 | Acetic (60) | 2:1 | 1.0 |
| 17-A₁ | 5,000 | Stearic (284) | 1:1 | 2.0 |
| 17-A₂ | 5,000 | ----do---- | 3:1 | 1.3 |
| 17-A₃ | 5,000 | Dimeric (600) (Emery Industries). | 1:1 | 1.5 |
| 18-A₁ | 10,000 | Diglycolic (134) | 4:1 | 0.9 |
| 18-A₂ | 10,000 | Diphenolic (286) | 2:1 | 1.0 |
| 18-A₃ | 10,000 | Naphthenic (330) | 1:1 | 1.0 |
| 19-A₁ | 20,000 | Maleic Anhydride (98) | 1:1 | |
| 19-A₂ | 20,000 | Nonanoic (158) | 4:1 | 3.2 |
| 19-A₃ | 20,000 | Oleic (282) | 2:1 | 2.1 |
| 20-A₁ | 40,000 | Myristic (228.4) | 2:1 | 1.7 |
| 20-A₂ | 40,000 | Oleic (282) | 3:1 | 2.8 |
| 20-A₃ | 40,000 | Alkenyl(C₁₂) Succinic Anhydride (266). | 1:1 | |

OXYALKYLATION

Polyethyleneimine can be oxyalkylated in the conventional manner, for example, by means of an alpha-beta alkylene oxide such as ethylene oxide, propylene oxide, butylene oxide, octylene oxide, a higher alkylene oxide, styrene oxide, glycide, methylglycide, etc., or combinations thereof. Depending on the particular application desired, one may combine a large proportion of alkylene oxide, particularly ethylene oxide, propylene oxide, a combination or alternate additions of propylene oxide and ethylene oxide, or smaller proportions thereof in relation to polyethyleneimine. Thus, the molar ratio of alkylene oxide to polyethyleneimine can range within wide limits, for example, from a 1:1 mole ratio to a ratio of 1000:1, or higher, but preferably 1 to 200. For example, in demulsification extremely high alkylene oxide ratios are often advantageously employed such as 200–300 or more moles of alkylene oxide per mole of polyethyleneimine. On the other hand, for certain applications such as corrosion prevention and use as fuel oil additives, lower ratios of alkylene oxides are advantageously employed, i.e., 1/10–25 moles of alkylene oxide per mole of polyethyleneimine. With higher molecular weight polyethyleneimine, more oxyalkylatable reaction centers are present for alkylene oxide addition and very high ratios of alkylene oxide can be added. By proper control, desired hydrophilic or hydrophobic properties are imparted to the composition. As is well known, oxyalkylation reactions are conducted under a wide variety of conditions, at low or high pressures, at low or high temperatures, in the presence or absence of catalyst, solvent, etc. For instance oxyalkylation reactions can be carried out at temperatures of from 80–200° C., and pressures of from 10 to 200 p.s.i., and times of from 15 min. to several days. Preferably oxyalkylation reactions are carried out at 80 to 120° C. and 10 to 30 p.s.i. For conditions of oxyalkylation reactions see U.S. Patent 2,792,369 and other patents mentioned therein.

Oxyalkylation is too well known to require a full discussion. For purpose of brevity reference is made to Parts 1 and 2 of U.S. Patent No. 2,792,371, dated May 14, 1957, to Dickson in which particular attention is directed to the various patents which described typical oxyalkylation procedure. Furthermore, manufacturers of alkylene oxides furnish extensive information as to the use of oxides. For example, see the technical bulletin entitled "Ethylene Oxide" which has been distributed by the Jefferson Chemical Company, Houston, Tex. Note also the extensive bibliography in this bulletin and the large number of patents which deal with oxyalkylation processes.

The symbol employed to designate oxyalkylation is "O". Specifically "1–O" represents oxyalkylated polyethyleneimine.

In the following oxyalkylations the reaction vessel employed is a stainless steel autoclave equipped with the usual devices for heating and heat control, a stirrer, inlet and outlet means and the like which are conventional in this type of apparatus. The stirrer is operated at a speed of 250 r.p.m. Polyethyleneimine dissolved and/or suspended in an equal weight of xylene is charged into the reactor. The autoclave is sealed, swept with nitrogen, stirring started immediately and heat applied. The temperature is allowed to rise to approximately 100° C. at which time the addition of the alkylene oxide is started and added continuously at such speed as it is absorbed by the reaction mixture. When the rate of oxyalkylation slows down appreciably, which generally occurs after about 15 moles of ethylene oxide are added or after about 10 moles of propylene oxide are added, the reaction vessel is opened and an oxyalkylation catalyst is added (in 2 weight percent of the total reactants present). The catalyst employed in the examples is sodium methylate. Thereupon the autoclave is flushed out as before and oxyalkylation completed. In the case of oxybutylation, oxyoctylation, oxystyrenation, and other oxyalkylations, etc., the catalyst is added at the beginning of the operation.

*Example 1–O₁*

Using the oxyalkylation apparatus and procedure stated above, the following compounds are prepared: 900 grams (1 mol) of polyethyleneimine 900 in xylene are charged into a stainless steel autoclave, swept with nitrogen, stirring started, and autoclave sealed. The temperature is allowed to rise approximately 100° C. and ethylene oxide is injected continuously until 220 grams (5 mols) total had been added over a one-half hour period. This reaction is exothermic and requires cooling to avoid a rise in temperature after removal of xylene. The reaction mass is transferred to a suitable container. Upon cooling to room temperature, the reaction mass is a dark extremely viscous liquid.

*Example 1-$O_2$*

The same procedure as Example 1-$O_1$ is used except that 396 grams of ethylene oxide (9 mols) is added to 900 grams (1 mol) of polyethyleneimine 900. This reaction material is a dark viscous liquid at room temperature.

*Example 1-$O_3$*

The same procedure as Example 1-$O_1$ is used and 396 grams of ethylene oxide (9 mols) are added to 900 grams (1 mol) of polyethyleneimine 900. After this reaction is completed, the autoclave is opened and 20 grams of sodium methylate are added. The autoclave is then flushed again with nitrogen and an additional 572 grams (13 mols) of ethylene oxide is added at 100° C. This reaction is highly exothermic. The reaction mass now contains 1 mol of polyethyleneimine 900 and a total of 22 mols of reacted ethylene oxide.

*Example 1-$O_4$*

A portion of the reaction mass of Example 1-$O_3$ is transferred to another autoclave and an additional amount of EtO was added. The reaction mass now contains the ratio of 1 mol of polyethyleneimine 900 to 40 mols of EtO.

*Example 1-$O_5$*

The addition of ethylene oxide to Example 1-$O_4$ is continued until a molar ratio of 1 mol of polyethyleneimine 900 to 75 mols of EtO is reached.

*Example 1-$O_6$*

The addition of ethylene oxide to Example 1-$O_5$ is continued until a molar ratio of 1 mol of polyethyleneimine 900 to 83 mols of EtO is reached.

*Example 1-$O_7$*

The addition of ethylene oxide to the Example 1-$O_6$ is continued until a molar ratio of 1 mol of polyethyleneimine 900 to 105 mols of EtO is reached.

*Example 16-$O_1$*

2,000 grams (0.1 mol) of polyethyleneimine of molecular weight of 20,000 in xylene are charged into a conventional stainless steel autoclave. The temperature is raised to 120° C., the autoclave is flushed with nitrogen and sealed. Then 11.6 grams of propylene oxide (0.2 mols) are added slowly at 120° C. A sample is taken at this point and labeled 16-$O_1$. This sample contains two mols of PrO for each mol of polyethyleneimine. It is a dark, pasty solid at room temperature.

*Example 16-$O_2$*

The addition of propylene oxide to 16-$O_1$ is continued as follows: The autoclave is opened and 5 grams of sodium methylate are added. The autoclave is again purged with nitrogen and sealed. Propylene oxide is added carefully until an additional 23.2 grams have been reacted. A sample is taken at this point and labeled 16-$O_2$. This compound now contains 6 mols of propylene oxide for each mol of polyethyleneimine 20,000.

*Example 16-$O_3$*

The oxypropylation of 16-$O_2$ is continued until an additional 52.2 grams of propylene oxide are reacted. A sample is taken at this point and labeled 16-$O_3$. 16-$O_3$ contains 15 mols of propylene oxide for each mol of polyethyleneimine 20,000. At room temperature the product is a dark, pasty solid.

This oxyalkylation is continued to produce examples 16-$O_4$, 16-$O_5$.

A summary of oxyalkylated products produced from polyethyleneimines is presented in the following Table II.

The Roman numerals (I), (II), and (III) besides the moles of oxide added indicate the order of oxide addition (I) first, (II) second and (III) third, etc.

The following abbreviations are also used throughout this application:

EtO—Ethylene oxide
PrO—Proylene oxide
BuO—Butylene oxide

TABLE–II.–OXYALKYLATED PRODUCTS
[Mols of alkylene oxide/mol polyethyleneimine]

| Ex. | Mol. Wt. of PE | EtO | PrO | BuO | Physical Properties |
|---|---|---|---|---|---|
| 1-$O_1$ | 900 | 5 | | | Viscous liquid. |
| 1-$O_2$ | 900 | 9 | | | Solid. |
| 1-$O_3$ | 900 | 22 | | | Do. |
| 1-$O_4$ | 900 | 40 | | | Do. |
| 1-$O_5$ | 900 | 75 | | | Do. |
| 1-$O_6$ | 900 | 83 | | | Do. |
| 1-$O_7$ | 900 | 105 | | | Do. |
| 1-$O_8$ | 900 | 200 | | | Do. |
| 2-$O_1$ | 900 | | 5 | | Viscous liquid. |
| 2-$O_2$ | 900 | | 11 | | Do. |
| 2-$O_3$ | 900 | | 20 | | Dark, thick liquid. |
| 2-$O_4$ | 900 | | 50 | | Do. |
| 2-$O_5$ | 900 | | 80 | | Do. |
| 2-$O_6$ | 900 | | 115 | | Do. |
| 2-$O_7$ | 900 | | 190 | | Do. |
| 2-$O_8$ | 900 | | 230 | | Do. |
| 3-$O_1$ | 900 | | | 4 | Do. |
| 3-$O_2$ | 900 | | | 15 | Do. |
| 3-$O_3$ | 900 | | | 35 | Do. |
| 3-$O_4$ | 900 | | | 60 | Do. |
| 4-$O_1$ | 900 | 10 (I) | 10 (II) | | Viscous liquid. |
| 4-$O_2$ | 900 | 10 (I) | 10 (II) | | Do. |
| 4-$O_3$ | 900 | 30 (II) | 10 (I) | | Solid. |
| 4-$O_4$ | 900 | 50 (II) | 60 (I) | | Do. |
| 5-$O_1$ | 900 | Glycidol, 4 mols | | | Viscous liquid. |
| 6-$O_1$ | 900 | 10 (II) | 10 (I) | 12 (III) | Dark, thick liquid. |
| 6-$O_2$ | 900 | 5 (III) | 50 (I) | 5 (II) | Do. |
| 6-$O_3$ | 900 | 18 (I) | 12 (III) | 10 (II) | Do. |
| 6-$O_4$ | 900 | 20 (I) | 90 (II) | 5 (III) | Do. |
| 7-$O$ | 900 | Octylene oxide, 8 mols | | | Viscous liquid. |
| 8-$O$ | 900 | Styrene oxide, 5 mols | | | Do. |
| 9-$O$ | 900 | Epoxide 201 (Carbide and Carbon) 1 mol | | | Solid. |
| 10-$O_1$ | 5,000 | 1 | | | Viscous liquid. |
| 10-$O_2$ | 5,000 | 7 | | | Do. |
| 10-$O_3$ | 5,000 | 15 | | | Solid. |
| 10-$O_4$ | 5,000 | 3 | | | Do. |
| 10-$O_5$ | 5,000 | 60 | | | Do. |
| 10-$O_6$ | 5,000 | 120 | | | Do. |
| 11-$O_1$ | 5,000 | | 3 | | Viscous liquid. |
| 11-$O_2$ | 5,000 | | 20 | | Dark, thick liquid. |
| 11-$O_3$ | 5,000 | | 40 | | Do. |
| 11-$O_4$ | 5,000 | | 80 | | Do. |
| 11-$O_5$ | 5,000 | | 160 | | Do. |
| 12-$O_1$ | 5,000 | | | 5 | Do. |
| 12-$O_2$ | 5,000 | | | 10 | Do. |
| 12-$O_3$ | 5,000 | | | 15 | Do. |
| 12-$O_4$ | 5,000 | | | 20 | Do. |
| 13-$O_1$ | 5,000 | 20 (I) | 20 (II) | | Viscous liquid. |
| 13-$O_2$ | 5,000 | 15 (I) | 80 (II) | | Solid. |
| 13-$O_3$ | 5,000 | 5 (II) | 45 (I) | | Do. |
| 13-$O_4$ | 5,000 | 10 (II) | 10 (I) | | Do. |
| 14-$O_1$ | 5,000 | 5 (III) | 5 (II) | 5 (I) | Viscous liquid. |
| 14-$O_2$ | 5,000 | 15 (II) | 10 (III) | 5 (I) | Do. |
| 14-$O_3$ | 5,000 | 5 (I) | 40 (II) | 15 (III) | Do. |
| 14-$O_4$ | 5,000 | 35 (I) | 10 (III) | 10 (II) | Solid. |
| 14-$O_5$ | 5,000 | 15 (I) | 15 (II) | 20 (III) | Viscous liquid. |
| 14-$O_6$ | 5,000 | 6 (III) | 3 (I) | 2 (II) | Solid. |
| 15-$O_1$ | 20,000 | 10 | | | Do. |
| 15-$O_2$ | 20,000 | 35 | | | Do. |
| 15-$O_3$ | 20,000 | 60 | | | Do. |
| 15-$O_4$ | 20,000 | 85 | | | Do. |
| 15-$O_5$ | 20,000 | 105 | | | Do. |
| 15-$O_6$ | 20,000 | 140 | | | Do. |
| 16-$O_1$ | 20,000 | | 2 | | Dark, pasty solid. |
| 16-$O_2$ | 20,000 | | 6 | | Do. |
| 16-$O_3$ | 20,000 | | 15 | | Do. |
| 16-$O_4$ | 20,000 | | 35 | | Do. |
| 16-$O_5$ | 20,000 | | 60 | | Do. |
| 17-$O_1$ | 20,000 | 4 (I) | 4 (II) | | Pasty solid. |
| 17-$O_2$ | 20,000 | 15 (I) | 30 (II) | | Do. |
| 17-$O_3$ | 20,000 | 30 (II) | 30 (I) | | Do. |
| 17-$O_4$ | 20,000 | 7 (II) | 18 (I) | | Do. |
| 18-$O_1$ | 20,000 | 5 (I) | 5 (I) | 15 (II) | Solid. |
| 18-$O_2$ | 20,000 | 5 (I) | 40 (III) | 6 (II) | Light brown solid. |
| 18-$O_3$ | 20,000 | 15 (II) | 10 (I) | 30 (III) | Do. |
| 18-$O_4$ | 20,000 | 3 (II) | 8 (III) | 16 (I) | Do. |
| 18-$O_5$ | 20,000 | 20 (III) | 80 (I) | 3 (II) | Do. |
| 18-$O_6$ | 20,000 | 6 (III) | 18 (II) | 6 (I) | Do. |
| 19-$O_1$ | 50,000 | 2 | | | Do. |
| 19-$O_2$ | 50,000 | 6 | | | Solid. |
| 19-$O_3$ | 50,000 | 15 | | | Do. |
| 19-$O_4$ | 50,000 | 30 | | | Do. |
| 19-$O_5$ | 50,000 | 50 | | | Do. |
| 19-$O_6$ | 50,000 | 100 | | | Do. |
| 19-$O_7$ | 50,000 | 200 | | | Hard solid. |
| 19-$O_8$ | 50,000 | 400 | | | Pasty solid. |
| 20-$O_1$ | 50,000 | | 5 | | Do. |
| 20-$O_2$ | 50,000 | | 20 | | Do. |
| 20-$O_3$ | 50,000 | | 40 | | Do. |

TABLE II.—Continued

| Ex. | Mol. Wt. of PE | EtO | PrO | BuO | Physical Properties |
|---|---|---|---|---|---|
| 20-O₄ | 50,000 |  | 80 |  | Pasty solid. |
| 20-O₅ | 50,000 |  | 160 |  | Do. |
| 20-O₆ | 50,000 |  | 320 |  | Do. |
| 21-O | 50,000 | Epichlorohydrin, 3 mols | | | Do. |
| 22-O₁ | 50,000 | 18 (I) | 4 (II) | 4 (III) | Waxy solid. |
| 22-O₂ | 50,000 | 6 (II) | 12 (I) | 12 (III) | Do. |
| 22-O₃ | 50,000 | 14 (III) | 22 (I) | 10 (I) | Do. |
| 22-O₄ | 50,000 | 5 (I) | 48 (III) | 6 (II) | Do. |
| 22-O₅ | 50,000 | 1 (II) | 10 (I) | 3 (II) | Do. |
| 22-O₆ | 50,000 | 10 (III) | 80 (I) | 10 (II) | Do. |
| 23-O₁ | 100,000 | 1 |  |  | Do. |
| 23-O₂ | 100,000 | 5 |  |  | Do. |
| 23-O₃ | 100,000 | 14 |  |  | Do. |
| 23-O₄ | 100,000 | 24 |  |  | Do. |
| 23-O₅ | 100,000 | 48 |  |  | Do. |
| 23-O₆ | 100,000 | 60 |  |  | Do. |
| 23-O₇ | 100,000 | 75 |  |  | Do. |
| 23-O₈ | 100,000 | 150 |  |  | Do. |
| 24-O₁ | 100,000 |  | 1 |  | Do. |
| 24-O₂ | 100,000 |  | 3 |  | Do. |
| 24-O₃ | 100,000 |  | 5 |  | Do. |
| 24-O₄ | 100,000 |  | 10 |  | Do. |
| 24-O₅ | 100,000 |  | 20 |  | Do. |
| 24-O₆ | 100,000 |  | 40 |  | Do. |
| 24-O₇ | 100,000 |  | 80 |  | Do. |
| 24-O₈ | 100,000 |  | 160 |  | Do. |
| 24-O₉ | 100,000 |  | 320 |  | Do. |
| 24-O₁₀ | 100,000 |  | 640 |  | Do. |
| 25-O₁ | 100,000 | 25 (I) | 10 (II) |  | Do. |
| 25-O₂ | 100,000 | 3 (II) | 3 (I) | 4 (III) | Do. |
| 25-O₃ | 100,000 | 5 (II) | 25 (I) | 30 (III) | Do. |
| 25-O₄ | 100,000 | 6 (II) | 16 (I) | 28 (III) | Do. |
| 26-O₁ | 100,000 | 8 (III) | 8 (II) | 8 (I) | Do. |
| 26-O₂ | 100,000 | 6 (III) | 10 (I) | 4 (II) | Do. |
| 26-O₃ | 100,000 | 5 (I) | 15 (III) | 3 (II) | Do. |
| 26-O₄ | 100,000 | 15 (II) | 20 (I) | 6 (III) | Do. |
| 26-O₅ | 100,000 | 2 (I) | 25 (II) | 2 (III) | Do. |
| 26-O₆ | 100,000 | 4 (I) | 14 (III) | 6 (II) | Do. |

The following table presents specific illustration of compounds other than polyethyleneimine and its derivatives.

TABLE II-A.—OXYALKYLATED PRODUCTS OF POLYPROPYLENEIMINE

| Ex. | Mol. Wt. of polypropyleneimine | Mols of alkylene oxide per mol of polypropyleneimine | | | Physical Properties |
|---|---|---|---|---|---|
| | | EtO | PrO | BuO | |
| 27-O₁ | 500 | 1 |  |  | Viscous liquid. |
| 27-O₂ | 500 | 5 |  |  | Do. |
| 27-O₃ | 500 | 10 |  |  | Solid. |
| 27-O₄ | 500 | 20 |  |  | Do. |
| 27-O₅ | 500 | 50 |  |  | Do. |
| 27-O₆ | 500 | 100 |  |  | Do. |
| 28-O₁ | 500 |  | 1 |  | Viscous Liquid. |
| 28-O₂ | 500 |  | 5 |  | Do. |
| 28-O₃ | 500 |  | 10 |  | Do. |
| 28-O₄ | 500 |  | 20 |  | Do. |
| 28-O₅ | 500 |  | 50 |  | Do. |
| 28-O₆ | 500 |  | 100 |  | Do. |
| 28-O₇ | 500 |  | 200 |  | Do. |
| 29-O₁ | 500 |  |  | 1 | Do. |
| 29-O₂ | 500 |  |  | 5 | Do. |
| 29-O₃ | 500 |  |  | 10 | Do. |
| 29-O₄ | 500 |  |  | 20 | Do. |
| 29-O₅ | 500 |  |  | 40 | Do. |
| 30-O₁ | 500 | 5 (I) | 10 (II) |  | Do. |
| 30-O₂ | 500 | 10 (I) | 5 (II) |  | Paste. |
| 31-O₁ | 500 | 20 (I) | 3 (I) |  | Solid. |
| 31-O₂ | 500 | 12 (II) | 44 (I) |  | Thick dark liquid. |
| 32-O₁ | 500 | 5 (III) | 10 (I) | 10 (I) | Do. |
| 32-O₂ | 500 | 10 (II) | 40 (I) | 3 (III) | Do. |
| 32-O₃ | 500 | 15 (I) | 80 (II) | 1 (III) | Do. |
| 32-O₄ | 500 | 5 (I) | 20 (III) | 2 (II) | Do. |
| 33-O | 500 | Octylene oxide, 5 mols | | | Do. |
| 34-O | 500 | Styrene oxide, 3 mols | | | Do. |
| 35-O | 500 | Epoxide 201 (Carbide and Carbon) 1 mol | | | Solid. |
| 36-O₁ | 1,000 | 1 |  |  | Viscous liquid. |
| 36-O₂ | 1,000 | 3 |  |  | Do. |
| 36-O₃ | 1,000 | 12 |  |  | Solid. |
| 36-O₄ | 1,000 | 18 |  |  | Do. |
| 36-O₅ | 1,000 | 50 |  |  | Do. |
| 36-O₆ | 1,000 | 100 |  |  | Do. |
| 36-O₇ | 1,000 | 300 |  |  | Waxy solid. |
| 37-O₁ | 1,000 |  | 5 |  | Viscous liquid. |
| 37-O₂ | 1,000 |  | 10 |  | Do. |
| 37-O₃ | 1,000 |  | 20 |  | Do. |
| 37-O₄ | 1,000 |  | 40 |  | Do. |
| 37-O₅ | 1,000 |  | 80 |  | Do. |
| 38-O₁ | 1,000 | 10 (I) | 20 (II) |  | Do. |
| 38-O₂ | 1,000 | 15 (II) | 5 (I) |  | Solid. |
| 39-O₁ | 1,000 | 4 (I) | 3 (II) | 2 (II) | Viscous Liquid. |
| 39-O₂ | 1,000 | 6 (II) | 10 (III) | 3 (I) | Do. |
| 39-O₃ | 1,000 | 14 (III) | 2 (II) | 8 (I) | Solid. |

TABLE II-A.—Continued

| Ex. | Mol. Wt. of polypropyleneimine | Mols of alkylene oxide per mol of polypropyleneimine | | | Physical Properties |
|---|---|---|---|---|---|
| | | EtO | PrO | BuO | |
| 39-O₄ | 1,000 | 10 (II) | 10 (III) | 10 (I) | Thick liquid. |
| 40-O | 1,000 | Epoxide 201 (Carbide and Carbon) 2 mols | | | Solid. |
| 41-O | 1,000 | Styrene oxide, 6 mols | | | Viscous liquid. |
| 42-O | 1,000 | Octylene oxide, 2 mols | | | Do. |
| 43-O₁ | 5,000 | 1 |  |  | Do. |
| 43-O₂ | 5,000 | 5 |  |  | Do. |
| 43-O₃ | 5,000 | 20 |  |  | Solid. |
| 43-O₄ | 5,000 | 45 |  |  | Do. |
| 43-O₅ | 5,000 | 75 |  |  | Do. |
| 43-O₆ | 5,000 | 125 |  |  | Do. |
| 44-O₁ | 5,000 |  | 3 |  | Viscous liquid. |
| 44-O₂ | 5,000 |  | 12 |  | Thick liquid. |
| 44-O₃ | 5,000 |  | 35 |  | Do. |
| 44-O₄ | 5,000 |  | 60 |  | Do. |
| 44-O₅ | 5,000 |  | 100 |  | Do. |
| 44-O₆ | 5,000 |  | 140 |  | Do. |
| 44-O₇ | 5,000 |  | 200 |  | Do. |
| 45-O₁ | 5,000 | 5 (IIII) | 40 (II) | 3 (I) | Viscous liquid. |
| 45-O₂ | 5,000 | 10 (II) | 80 (III) | 10 (I) | Do. |
| 45-O₃ | 5,000 | 20 (I) | 40 (I) | 4 (II) | Do. |
| 45-O₄ | 5,000 | 2 (I) | 4 (III) | 2 (II) | Do. |
| 46-O₁ | 5,000 |  |  | 1 | Do. |
| 46-O₂ | 5,000 |  |  | 3 | Do. |
| 46-O₃ | 5,000 |  |  | 10 | Do. |
| 46-O₄ | 5,000 |  |  | 20 | Do. |
| 46-O₅ | 5,000 |  |  | 40 | Do. |
| 46-O₆ | 5,000 |  |  | 80 | Do. |
| 47-O | 5,000 | Epichlorohydrin, 2 mols | | | Do. |
| 48-O₁ | 10,000 | 3 |  |  | Pasty solid. |
| 48-O₂ | 10,000 | 6 |  |  | Do. |
| 48-O₃ | 10,000 | 15 |  |  | Do. |
| 48-O₄ | 10,000 | 30 |  |  | Do. |
| 48-O₅ | 10,000 | 90 |  |  | Do. |
| 49-O₁ | 10,000 |  | 2 |  | Do. |
| 49-O₂ | 10,000 |  | 5 |  | Do. |
| 49-O₃ | 10,000 |  | 20 |  | Do. |
| 49-O₄ | 10,000 |  | 50 |  | Do. |
| 50-O₁ | 10,000 |  |  | 1 | Do. |
| 50-O₂ | 10,000 |  |  | 3 | Do. |
| 50-O₃ | 10,000 |  |  | 10 | Do. |
| 51-O₁ | 10,000 | 6 (II) | 10 (III) | 14 (I) | Do. |
| 51-O₂ | 10,000 | 22 (III) | 1 (II) | 4 (I) | Do. |
| 51-O₃ | 10,000 | 6 (I) | 2 (II) | 3 (III) | Do. |
| 51-O₄ | 10,000 | 5 (I) | 18 (III) | 2 (II) | Do. |
| 52-O | 10,000 | Octylene oxide, 4 mols | | | Do. |
| 53-O | 10,000 | Epoxide 201 (Carbide and Carbon) 1 mol | | | Do. |
| 54-O₁ | 20,000 | 1 |  |  | Waxy solid. |
| 54-O₂ | 20,000 | 5 |  |  | Do. |
| 54-O₃ | 20,000 | 25 |  |  | Do. |
| 50-O₄ | 20,000 | 75 |  |  | Do. |
| 54-O₅ | 20,000 | 150 |  |  | Do. |
| 55-O₁ | 20,900 |  | 1 |  | Do. |
| 55-O₂ | 20,000 |  | 3 |  | Do. |
| 55-O₃ | 20,000 |  | 8 |  | Do. |
| 55-O₄ | 20,000 |  | 20 |  | Do. |
| 55-O₅ | 20,000 |  | 40 |  | Do. |
| 55-O₆ | 20,000 |  | 80 |  | Do. |
| 56-O₁ | 20,000 |  |  | 1 | Do. |
| 56-O₂ | 20,000 |  |  | 2 | Do. |
| 56-O₃ | 20,000 |  |  | 3 | Do. |
| 56-O₄ | 20,000 |  |  | 5 | Do. |
| 56-O₅ | 20,000 |  |  | 10 | Do. |
| 56-O₆ | 20,000 |  |  | 20 | Do. |
| 57-O₁ | 20,000 | 6 (I) | 16 (II) | 4 (III) | Do. |
| 57-O₂ | 20,000 | 5 (III) | 40 (II) | 2 (I) | Do. |
| 57-O₃ | 20,000 | 20 (I) | 60 (II) | 5 (III) | Do. |
| 57-O₄ | 20,000 | 5 (I) | 15 (III) | 8 (II) | Do. |
| 58-O₁ | 40,000 | 2 |  |  | Do. |
| 58-O₂ | 40,000 | 10 |  |  | Do. |
| 58-O₃ | 40,900 | 15 |  |  | Do. |
| 58-O₄ | 40,900 | 20 |  |  | Do. |
| 59-O₁ | 40,000 |  | 5 |  | Do. |
| 59-O₂ | 40,000 |  | 10 |  | Do. |
| 59-O₃ | 40,000 |  | 20 |  | Do. |
| 59-O₄ | 40,000 |  | 40 |  | Do. |
| 59-O₅ | 40,000 |  | 80 |  | Do. |
| 60-O₁ | 40,000 |  |  | 1 | Do. |
| 60-O₂ | 40,000 |  |  | 3 | Do. |
| 60-O₃ | 40,000 |  |  | 10 | Do. |
| 60-O₄ | 40,900 |  |  | 20 | Do. |
| 61-O₁ | 40,000 | 3 (I) | 2 (III) | 6 (II) | Do. |
| 61-O₂ | 40,000 | 40 (I) | 5 (II) | 3 (III) | Do. |
| 61-O₃ | 40,000 | 3 (II) | 18 (III) | 6 (I) | Do. |
| 61-O₄ | 40,000 | 2 (II) | 2 (I) | 2 (III) | Do. |
| 62-O₁ | 40,000 | 20 (I) | 20 (I) |  | Do. |
| 62-O₂ | 40,000 | 5 (II) | 40 (I) |  | Do. |

ACYLATION THEN OXYALKYLATION

Prior acylated polyethyleneimine can be oxyalkylated in the above manner by starting with acylated polyethyleneimine instead of the unreacted polymer. Non-limiting examples are presented in the following tables. The symbol employed to designate an acylate, oxyalkylated polyethyleneimine is "AO." Specifically "1–A$_4$O$_1$" represents acylated, then oxyalkylated polyethyleneimine.

*Example 1–A$_5$O$_3$*

For this example an autoclave equipped to handle alkylene oxides is necessary. 1671 grams (1 mole) of 1–A$_5$ are charged into the autoclave. Following a nitrogen purge and the addition of 75 grams of sodium methylate, the temperature is raised to 135° C. and 2436 grams of PrO (42 mols) are added. At the completion of this reaction, 440 grams of EtO (10 mols) are added and the reaction allowed to go to completion. The resulting polymer is a dark viscous fluid soluble in an aromatic solvent. Ratio of reactants, 1 mole starting material/PrO 42 mols/EtO 10 mols.

*Example 2–A$_4$O*

For this example a conventional autoclave equipped to handle alkylene oxides is necessary. 525 grams of 2–A$_4$ (0.1 mol) are charged into the autoclave. The charge is catalyzed with 20 grams of sodium methylate, purged with nitrogen and heated to 150° C. 24.6 grams (0.2 moles) of styrene oxide are added and reacted for four hours with agitation. The resulting product is a dark extremely viscous fluid. Ratio of reactants 1 mole starting material/2 moles EtO.

These reactants and other reactants are summarized in the following table.

TABLE III.—OXYALKYLATED, PRIOR ACYLATED POLYETHYLENEIMINE

[Mols of oxide per mol of reactant]

| Example | EtO | PrO | BuO | Physical Property |
|---|---|---|---|---|
| 1–A$_5$O$_1$ | 5 | | | Viscous liquid. |
| 1–A$_5$O$_2$ | | 22 | | Do. |
| 1–A$_5$O$_3$ | 10 (II) | 42 (I) | | Do. |
| 1–A$_5$O$_4$ | 14 (III) | 26 (II) | 10 (I) | Do. |
| 1–A$_5$O$_5$ | 4 (I) | 12 (II) | | Do. |
| 1–A$_5$O$_6$ | | | 8 | Do. |
| 2–A$_4$O | Styrene Oxide, 2 mols | | | Dark, viscous liquid. |
| 4–A$_2$O | 24 | | | Solid. |
| 5–A$_2$O | 2 (I) | 4 (II) | 6 (III) | Thick liquid. |
| 6–A$_4$O | | 6 | | Do. |
| 9–A$_2$O | Octylene oxide, 5 mols | | | Do. |
| 10–A$_1$O$_1$ | 4 (II) | 28 (I) | | Do. |
| 10–A$_1$O$_2$ | 35 | | | Solid. |
| 10–A$_1$O$_3$ | | | 10 | Viscous liquid. |
| 11–A$_3$O$_1$ | | 5 | | Do. |
| 11–A$_3$O$_2$ | 8 (III) | 60 (II) | 2 (I) | Do. |
| 12–A$_2$O$_1$ | 12 | | | Solid. |
| 12–A$_2$O$_2$ | 4 (II) | 5 (I) | | Do. |

The following table presents specific illustration of compounds other than polyethyleneimine and its derivatives.

TABLE III–A.—OXYALKYLATED, PRIOR ACYLATED POLYPROPYLENEIMINE

| Example | EtO | PrO | BuO | Physical Property |
|---|---|---|---|---|
| 15–A$_2$O$_1$ | | 10 | | Viscous liquid. |
| 15–A$_2$O$_2$ | 3 | | | Do. |
| 15–A$_2$O$_3$ | 2 (I) | 2 (II) | | Do. |
| 15–A$_2$O$_4$ | 6 (II) | 10 (III) | 2 (I) | Do. |
| 15–A$_2$O$_5$ | | | 4 | Do. |
| 16–A$_1$O | Epoxide 201 (Carbide and Carbon), 1 mol | | | Do. |
| 17–A$_3$O$_1$ | 10 (II) | 80 (I) | | Do. |
| 17–A$_3$O$_2$ | | | 20 | Do. |
| 18–A$_3$O$_1$ | 3 | | | Pasty solid. |
| 18–A$_3$O$_2$ | Octylene oxide, 5 mols | | | Do. |
| 18–A$_3$O$_3$ | 20 (II) | | 5 (I) | Do. |
| 18–A$_3$O$_4$ | | 8 | | Do. |
| 19–A$_3$O$_1$ | Styrene oxide, 3 mols | | | Do. |
| 19–A$_3$O$_2$ | 5 (III) | 40 (II) | 2 (I) | Do. |
| 19–A$_3$O$_3$ | 12 (II) | 65 (I) | | Do. |
| 20–A$_1$O$_1$ | Epichlorophydrin, 2 mols | | | Do. |
| 20–A$_1$O$_2$ | 1 | | | Do. |
| 20–A$_1$O$_3$ | | 3 | | Do. |

OXYALKYLATION THEN ACYLATION

The prior oxyalkylated polyethyleneimine can be acylated with any of the acylation agents herein disclosed (in contrast to acylation prior to oxyalkylation). Since these reactants also have hydroxy groups, acylation, in addition to reaction with amino groups noted above, also includes esterification.

The method of acylation in this instance is similar to that carried out with polyethyleneimine itself, i.e., dehydration wherein the removal of water is a test of the completion of the reaction.

*Example 1–O$_1$A$_1$*

One mole of 1–O$_1$ (1120 grams) in 500 ml. of xylene is mixed with three moles of acetic acid (180 grams) at room temperature. The temperature is raised slowly to 120–130° C. and refluxed gently for one hour. The temperature is then raised to 150–160° C. and heated until 3 moles of water and all of the xylene are stripped off. The dark product is water-soluble.

*Example 2–O$_4$A*

0.1 mole of 2–O$_4$ (380 grams) in 400 ml. of xylene is mixed with 0.1 mole of palmitic acid (25.6 grams) at room temperature. Ratio 1 mole 2–O$_4$ to 1 mole of palmitic acid. Vacuum is applied and the temperature is raised slowly until one mole of water (18 grams) is removed. This product is a dark viscous liquid.

*Example 2–O$_6$A*

0.1 mole of 2–O$_6$ (757 grams) is mixed with 500 grams of xylene and heated to 100° C. 0.1 mole of diglycolic acid (13.4 grams) is added slowly to prevent excessive foaming. Ratio 1 mole 2–O$_6$ to 1 mole glycolic acid. The temperature is raised to 140–150° C. and held until one mole of water has evolved. This product is the diglycolic acid fractional ester of 2–O$_6$. A white precipitate forms during this reaction which can be removed by filtration. Analysis shows the precipitate to be sodium acid diglycolate, a reaction product of the catalyst and diglycolic acid. The filtered product is a dark viscous liquid at room temperature.

Table IV contains examples which further illustrate the invention. The symbol employed to designate oxyalkylated, acylated products is "OA."

TABLE IV.—ACYLATED, PRIOR OXYALKYLATED POLY ETHYLENEIMINE

| Ex. | Acylating Agent | Mols of acylating agent per mol oxyalkylated PE | Ratio mols of water removed to mols acylating agent employed | Physical Properties |
|---|---|---|---|---|
| 1–O$_1$A$_1$ | Acetic | 3 | 1 | Dark viscous liquid. |
| 1–O$_1$A$_2$ | Lauric | 1 | 1 | Do. |
| 1–O$_3$A | Acetic | 2 | 1 | Solid. |
| 2–O$_3$A | Oleic | 3 | 1 | Do. |
| 2–O$_4$A | Palmitic | 1 | 1 | Do. |
| 2–O$_6$A | Diglycolic | 1 | 1 | Do. |
| 4–O$_2$A | Stearic | 2 | 1 | Do. |
| 6–O$_1$A | Maleic anhydride | 1 | | Viscous liquid. |
| 12–O$_2$A | Myristic | 2 | 1 | Do. |
| 13–O$_3$A | Abietic | 1 | 1 | Do. |
| 14–O$_6$A | Palmitic | 2 | 1 | Do. |
| 15–O$_3$A | Tall oil | 1 | 1 | Do. |
| 16–O$_5$A | Diglycolic | 1 | 1 | Do. |
| 17–O$_3$A | Oleic | 1 | 2 | Do. |
| 18–O$_5$A | Lauric | 2 | 1 | Do. |
| 19–O$_1$A | Ricinoleic | 1 | 1 | Do. |
| 20–O$_6$A | Maleic anhydride | 1 | | Do. |
| 22–O$_5$A | Linoleic | 3 | 1 | Do. |
| 23–O$_2$A | Palmitic | 1 | 1 | Do. |
| 24–O$_1$A | Acetic | 1 | 1 | Do. |
| 25–O$_3$A$_1$ | Dimeric (Emery Indus.). | 1 | 1 | Solid. |
| 25–O$_3$A$_2$ | Diglycolic | 1 | 1 | Do. |
| 26–O$_1$A | Diphenolic | 1 | 1 | Do. |
| 26–O$_5$A | Terephthalic | 1 | 1 | Do. |
| 26–O$_5$A | Benzoic | 1 | 1 | Do. |

The following table presents specific illustration of compounds other than polyethyleneimine and its derivatives.

TABLE IV-A.—ACYLATED, PRIOR OXYALKYLATED POLYPROPYLENEIMINE

| Ex. | Acylating Agent | Mols of acylating agent per mol oxyalkylated PE | Ratio mols of water removed to mols acylating agent employed | Physical Properties |
|---|---|---|---|---|
| 27-$O_2A$ | Oleic | 2 | 2 | Thick dark liquid. |
| 27-$O_4A$ | Diphenolic | 1 | 1 | Pasty solid. |
| 28-$O_3A$ | Lauric | 3 | 1 | Do. |
| 28-$O_6A$ | Acetic | 4 | 1 | Do. |
| 29-$O_2A$ | Naphthenic | 1 | 1 | Do. |
| 31-$O_2A$ | Stearic | 2 | 2 | Do. |
| 32-$O_4A$ | Tall oil | 1 | 1 | Do. |
| 37-$O_1A$ | Maleic anhydride | 1 | | Do. |
| 39-$O_2A$ | Palmitic | 2 | 2 | Do. |
| 43-$O_6A$ | Dimeric (Emery industries) | 3 | 1 | Waxy solid. |
| 44-$O_5A$ | Diglycolic | 1 | 1 | Pasty solid. |
| 45-$O_1A$ | Myristic | 2 | 1 | Do. |
| 48-$O_5A$ | Ricinoleic | 1 | 1 | Do. |
| 50-$O_2A$ | Abietic | 2 | 2 | Do. |
| 51-$O_4A$ | Linoleic | 1 | 1 | Do. |
| 57-$O_3A$ | Nonanoic | 1 | 1 | Do. |
| 59-$O_5A$ | Lauric | 1 | 1 | Waxy solid. |
| 62-$O_2A$ | Diglycolic | 1 | 1 | Do. |

HEAT TREATMENT OF OXYALKYLATED PRODUCTS

The oxyalkylated products described herein, for example, those shown in Table II relating to oxyalkylated polyethyleneimine and those in Table III relating to oxyalkylated, prior acylated, polyethyleneimine can be heat treated to form useful compositions.

In general, the heat treatment is carried out at 200–250° C. Under dehydrating conditions, where reduced pressure and a fast flow of nitrogen is used, lower temperatures can be employed, for example 150–200° C.

Water is removed during the reaction, such as by means of a side trap. Nitrogen passing through the reaction mixture and/or reduced pressure can be used to facilitate water removal.

The exact compositions cannot be depicted by the usual chemical formulas for the reason that the structures are subject to a wide variation.

The heat treatment is believed to result in the polymerization of these compounds and is effected by heating same at elevated temperatures, generally in the neighborhood of 200–270° C., preferably in the presence of catalysts, such as sodium hydroxide, potassium hydroxide, sodium ethylate, sodium glycerate, or catalysts of the kind commonly employed in the manufacture of superglycerinated fats, calcium chloride, iron and the like. The proportion of catalyst employed may vary from slightly less than 0.1%, in some instances, to over 1% in other instances.

Conditions must be such as to permit the removal of water formed during the process. At times the process can be conducted most readily by permitting part of the volatile constituents to distill, and subsequently subjecting the vapors to condensation. The condensed volatile distillate usually contains water formed by reaction. The water can be separated from such condensed distillate by any suitable means, for instance, distilling with xylene, so as to carry over the water, and subsequently removing the xylene. The dried condensate is then returned to the reaction chamber for further use. In some instances, condensation can best be conducted in the presence of a high-boiling solvent, which is permitted to distill in such a manner as to remove the water of reaction. In any event, the speed of reaction and the character of the polymerized product depend not only upon the original reactants themselves, but also on the nature and amount of catalyst employed, on the temperature employed, the time of reaction, and the speed of water removal, i.e., the effectiveness with which the water of reaction is removed from the combining mass. Polymerization can be effected without the use of catalysts in some instances, but such procedure is generally undesirable, due to the fact that the reaction takes a prolonged period of time, and usually a significantly higher temperature. The use of catalyst such as iron, etc., fosters the reaction.

The following example are presented to illustrates heat treatment. The symbol used to designated a heat treated oxyalkylated polyethyleneimine is "OH" and an acylated, oxyalkylated product is "AOH." In all examples 500 grams of starting material are employed.

Example 2-$O_1H$

A conventional glass resin vessel equipped with a stirrer and water trap is used. Five hundred grams of 2-$O_1$ are charged into the above resin vessel along with five grams of $CaCl_2$. The temperature is raised to 225–250° C. and heated until 57 grams of water (3.2 mols) are evolved. This process takes 7.5 hours of heating. The product is an extremely viscous material at room temperature. However, upon warming slightly this product dissolves easily in water.

Example 19-$O_3H$

The process of the immediately previous example is repeated using 19-$O_3$ but substituting sodium methylate for calcium chloride. The product is a dark, viscous, water-soluble material.

Example 15-$O_6H$

The process of Example 2-$O_1H$ is repeated using 15-$O_6$ but substituting powdered iron from calcium chloride.

TABLE V.—HEAT TREATED (1) OXYALKYLATED AND (2) ACYLATED, OXYALKYLATED POLYETHYLENEIMINE

| Example | Reaction Temp., °C. | Catalyst (5 grams) | Water Removed | | Time in hours | Physical properties |
|---|---|---|---|---|---|---|
| | | | Grams | Mols | | |
| 1-$O_2H$ | 250 | Iron | 74 | 4.1 | 8.0 | Dark, viscous liquid. |
| 2-$O_1H$ | 225 | $CaCl_2$ | 57 | 3.2 | 16.5 | Do. |
| 3-$O_2H$ | 265 | Sodium methylate | 36 | 2.0 | 23 | Do. |
| 7-OH | 270 | $CaCl_2$ | 38 | 2.1 | 30 | Do. |
| 10-$O_2H$ | 255 | Iron | 95 | 5.3 | 9.5 | Solid. |
| 11-$O_1H$ | 240 | do | 32 | 1.8 | 12 | Viscous liquid. |
| 12-$O_3H$ | 260 | do | 40 | 2.2 | 13 | Do. |
| 13-$O_4H$ | 250 | $CaCl_2$ | 72 | 4 | 18 | Do. |
| 14-$O_1H$ | 200 | Iron oleate | 54 | 3 | 24 | Do. |
| 15-$O_6H$ | 265 | $CaCl_2$ | 90 | 5 | 30 | Do. |
| 16-$O_4H$ | 255 | Iron | 54 | 3 | 16 | Do. |
| 17-$O_1H$ | 235 | do | 36 | 2 | 18 | Do. |
| 19-$O_3H$ | 275 | Sodium methylate | 76 | 4.2 | 20 | Solid. |
| 20-$O_1H$ | 255 | Iron | 54 | 3 | 16 | Viscous liquid. |
| 22-$O_5H$ | 265 | do | 63 | 3.5 | 8 | Do. |
| 23-$O_3H$ | 255 | do | 57 | 3.2 | 12 | Do. |
| 24-$O_4H$ | 250 | do | 36 | 2 | 14 | Do. |
| 25-$O_2H$ | 260 | do | 38 | 2.1 | 11 | Do. |
| 26-$O_1H$ | 265 | do | 40 | 2.2 | 13 | Paste. |
| 1-$A_5O_1H$ | 225 | Sodium methylate | 36 | 2.0 | 16 | Do. |
| 5-$A_2OH$ | 240 | Iron | 40 | 2.2 | 8 | Do. |
| 11-$A_3O_1H$ | 235 | Iron oleate | 90 | 5 | 14 | Do. |
| 12-$A_2O_2H$ | 260 | $CaCl_2$ | 32 | 1.8 | 18 | Do. |

The following table presents specific illustration of compounds other than polyethyleneimine and its derivatives.

TABLE V-A.—HEAT TREATED (1) OXYALKYLATED AND (2) ACYLATED, OXYALKYLATED POLYPROPYLENEIMINE

| Example | Reaction Temp., °C. | Catalyst (5 grams) | Water Removed | | Time in hours | Physical properties |
|---|---|---|---|---|---|---|
| | | | Grams | Mols | | |
| 27-$O_3H$ | 260 | $CaCl_2$ | 32 | 1.8 | 18 | Dark, viscous liquid. |
| 28-$O_3H$ | 240 | Iron oleate | 40 | 2.2 | 8 | Do. |
| 29-$O_3H$ | 265 | Iron | 40 | 2.2 | 13 | Do. |
| 30-$O_1H$ | 250 | Sodium methylate | 36 | 2.0 | 14 | Do. |
| 32-$O_1H$ | 265 | Iron | 63 | 3.5 | 8 | Do. |
| 36-$O_3H$ | 275 | ----do---- | 76 | 4.2 | 20 | Do. |
| 37-$O_1H$ | 255 | ----do---- | 54 | 3.0 | 16 | Do. |
| 43-$O_3H$ | 200 | ----do---- | 54 | 3.0 | 24 | Pasty. |
| 46-$O_3H$ | 260 | ----do---- | 40 | 2.2 | 13 | Viscous liquid. |
| 47-$O_3H$ | 260 | Iron oleate | 95 | 5.3 | 9.5 | Do. |
| 48-$O_4H$ | 255 | Ferric chloride | 36 | 2.0 | 23 | Do. |
| 51-$O_3H$ | 270 | Iron | 74 | 4.1 | 8.0 | Do. |
| 52-$O_1H$ | 225 | Aluminum chloride | 32 | 1.8 | 18 | Do. |
| 55-$O_3H$ | 250 | $CaCl_2$ | 90 | 5.0 | 14 | Do. |
| 56-$O_4H$ | 235 | Sodium methylate | 36 | 2.0 | 16 | Do. |
| 58-$O_2H$ | 240 | Iron | 38 | 2.1 | 11 | Do. |
| 15-$A_2O_1H$ | 255 | ----do---- | 57 | 3.2 | 12 | Paste. |
| 17-$H_3O_2H$ | 245 | ----do---- | 54 | 3.0 | 16 | Do. |
| 19-$A_3O_1H$ | 270 | Iron oleate | 36 | 2.0 | 18 | Do. |
| 20-$A_1O_1H$ | 265 | $CaCl_2$ | 90 | 5.0 | 30 | Do. |
| 20-$A_1O_3H$ | 255 | Iron | 32 | 1.8 | 12 | Do. |

ALKYLATION

Alkylation relates to the reaction of polyethyleneimine and derivatives thereof with alkylating agents.

Any hydrocarbon halide, e.g. alkyl, alkenyl, cycloalkenyl, aralkyl, etc., halide which contains at least one carbon atom and up to about thirty carbon atoms or more per molecule can be employed to alkylate the products of this invention. It is especially preferred to use alkyl halides having between about one to about eighteen carbon atoms per molecule. The halogen portion of the alkyl halide reactant molecule can be any halogen atom, i.e., chlorine, bromine, fluorine, and iodine. In practice, the alkyl bromides and chlorides are used, due to their greater commercial availability. Non-limiting examples of the alkyl halide reactant are methyl chloride; ethyl chloride; propyl chloride; n-butyl chloride; sec-butyl iodide; t-butyl fluoride; n-amyl bromide; isoamyl chloride; n-hexyl bromide; n-hexyl iodide; heptyl fluoride; 2-ethyl-hexyl chloride; n-octyl bromide; decyl iodide; dodecyl bromide; 7-ethyl-2-methyl-undecyl iodide; tetradecyl bromide; hexadecyl bromide; hexadecyl fluoride; heptadecyl chloride; octadecyl bromide; decosyl chloride; tetracosyl iodide; hexacosyl bromide; octacosyl chloride; and triacontyl chloride. In addition, alkenyl halides can also be employed, for example, the alkenyl halides corresponding to the above examples. In addition, the halide may contain other elements besides carbon and hydrogen as, for example, where dichloroethylether is employed.

The alkyl halides can be chemically pure compounds or of commercial purity. Mixtures of alkyl halides, having carbon chain lengths falling within the range specified hereinbefore, can also be used. Examples of such mixtures are mono-chlorinated wax and mono-chlorinated kerosene. Complete instructions for the preparation of monochlorowax have been set forth in United States Patent 2,238,790.

Since the reaction between the alkyl halide reactant and polyethyleneimine is a condensation reaction, or an alkylation reaction, characterized by the elimination of hydrogen halide, the general conditions for such reactions are applicable herein. For certain uses it is preferable to carry out the reaction at temperatures of between about 100° and about 250° C., preferably between about 140° C. and about 200° C., in the presence of a basic material which is capable of reacting with the hydrogen halide to remove it. Such basic materials are, for example, sodium bicarbonate, sodium carbonate, pyridine, tertiary alkyl amines, alkali or alkaline earth metal hydroxides, and the like.

It is preferred to perform the reaction between the alkyl halide reactant and polyethyleneimine in a hydrocarbon solvent under reflux conditions. The aromatic hydrocarbon solvents of the benzene series are especially preferable. Non-limiting examples of the preferred solvent are benzene, toluene, and xylene. The amount of solvent used is a variable and non-critical factor. It is dependent on the size of the reaction vessel and on the reaction temperature selected. For example, it will be apparent that the amount of solvent used can be so great that the reaction temperature is lowered thereby.

The time of reaction between the alkyl halide reactant and polyethyleneimine is dependent on the weight of the charge, the reaction temperature selected, and the means employed for removing the hydrogen halide from the reaction mixture. In practice, the reaction is continued until no more hydrogen halide is formed. In general, the time of reaction will vary widely, such as between about four and about ten hours.

It can be postulated that the reaction between the alkyl halide reactant and polyethyleneimine results in the formation of products where the alkyl group of the alkyl halide has replaced a hydrogen atom attached to a nitrogen atom. It is also conceivable that alkylation of an alkylene group of polyethyleneimine can occur. However, the eaxct composition of any given reaction product cannot be predicted. For example, when two moles of butyl bromide are reacted with one mole of polyethyleneimine 900, a mixture of mono-, di- and tri and higher N-alkylated products can be produced. Likewise, the alkyl groups can be substituted on different nitrogen atoms in different molecules of polyethyleneimine.

Thus, the term "Alkylation" as employed herein and in the claims include alkenylation, cycloalkenylation, aralkylation, etc., and other hydrocarbonylation as well as alkylation itself.

In general, the following examples are prepared by reacting the alkyl halide with the polyethyleneimine at the desired ratio in the persence of one equivalent of base for each equivalent HCl given off during the reaction. Water formed during the reaction is removed by distillation. Where the presence of the anions, such as chlorine, bromine, etc., is not material and salts and quaternary compounds are desired, no base is added.

The following examples are presented to illustrate alkylation of polyethyleneimine.

In these examples, the term "mesomer" is employed. A mesomer is defined as a *repeating radical* which, when combined with other mesomers, forms the principal portion of the polymer molecule.

Thus, the unit

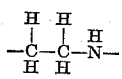

is the "mesomer" of polyethyleneimine, since polyethyleneimine may be represented by the formula

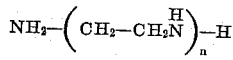

*Example 5K₂*

430 grams of polyethyleneimine 50,000, equivalent to 10 mesomeric units of ethyleneimine, in 500 ml. of xylene and 570 grams of sodium carbonate, equivalent to 8 moles, are placed in a reaction vessel equipped with a mechanical stirrer, a thermometer and a reflux condenser take-off for removal of volatile components. The stirred reactants are heated to about 100° C. whereupon 1140 g. (8 mols) of dichloroethyl ether is started in slowly at such a rate that the temperature of the reaction vessel contents never exceeds 165° C., but preferably stays around 135° C. The reaction is exothermic and 5–6 hours are required to add all the dichloroethyl ether. After all the dichloroethyl ether has been added, the temperature is allowed to drop to about 90–100° whereupon reduced pressure is applied to the reaction vessel and all xylene stripped out. The material left in the vessel is a thick brown liquid which solidifies upon cooling to a glassy-solid.

*Example 8–A₁*

The equivalent of 8 mesomeric units, based on polyethyleneimine, of the material 8–A₁ (Table 1) in 300 g. xylene is placed in a reaction vessel described in the above example for 5–K₂. 340 grams anhydrous sodium carbonate, equivalent to 3.2 moles are added followed by 1.6 moles dimethyl sulfate. The temperature is then brought up to 125° C. and held there for a period of 6–8 hours. Xylene is then removed under reduced temperature and pressure conditions as in the example for 5–K₂. The resulting product, a dark amber material, is very viscous at ordinary temperature.

*Example 20–O₁HK*

The equivalent of 10 mesomeric units based on polyethyleneimine of the materials 20–O₁H (Table V) in 300 ml. of xylene and 420 grams sodium bicarbonate, equivalent to 5 moles, are placed in an autoclave equipped with a stirring device, a thermometer and a condenser reflux device which can be closed off from the autoclave during reactions in which pressures above atmosphere are experienced. The autoclave is closed and heat is applied to bring up the temperature to 120–130° C. at which time 5 mols methyl chloride are added slowly while never allowing pressure to exceed 5 atmospheres pressure. Several hours will be necessary to get all methyl chloride in and pressure inside the vessel down to one atmosphere. At this point the reflux condenser is opened, the temperature is allowed to drop to 90–100° C. and a slight vacuum applied in order to reflux the xylene out of the autoclave. The resulting material is a very viscous amber colored liquid.

The reactions shown in the following table are carried out in a similar manner. Each reaction in the table is carried out in two ways—(1) in the presence of base, as in 5–K₂ to yield the alkylation product and (2) in the absence of base to yield the halogen-containing or sulfate-containing (5–K₂X) products.

The alkylated products of this invention contain primary, secondary, tertiary, and quaternary amino groups. By controlling the amount of alkylation agent employed and the conditions of the reaction, etc., one can control the type and amount of alkylation. For example, by reacting less than the stoichiometric amount of alkylation agent one could preserve the presence of nitrogen-bonded hydrogen present on the molecule and by exhaustive alkylation in the presence of sufficient basic material, one can form more highly alkylated compounds.

The moles of alkylating agent reacted with polyethyleneimine will depend on the number of alkylation reactive positions contained therein as well as the number of moles of alkylating agent one wishes to incorporate into the molecule. Theoretically, every hydrogen bonded to a nitrogen atom can be alkylated. We have advantageously reacted 1–20 moles of alkylating agent per moles of polyethyleneimine 900 but preferably 1–12 moles. With polyethyleneimine 20,000 greater amounts of alkylating agent can be employed, for example 1–50 moles, and with polyethyleneimine 40,000, 1–100 moles, etc. Optimum alkylation will depend on the particular application.

In addition, the alkyl halide may contain functional groups. For example, chloroacetic acid can be reacted with polyethyleneimine to yield a compound containing carboxylic acid groups.

$PN-CH_2COOH$, wherein P is the residue of polyethyleneimine.

In addition, polyethyleneimine can be alkylated with an alkyl halide such as alkyl chloride and then reacted with chloroacetic acid to yield an alkylated polyethyleneimine containing carboxylic acid groups

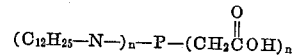

The symbol employed to designate an alkylated polyethyleneimine is "K." Where the product is a salt or a quaternary the symbol is "KX." Thus, for example, where no acceptor base is employed and a salt is allowed to form 1–A₅O₅K would be 1–A₅O₅KX.

TABLE VI.—ALKYLATED PRODUCTS

| Example | Mol. Wt. PE | Alkylating agent | Mols alkylating agent per mesomer unit | Physical properties |
|---|---|---|---|---|
| 1-K₁ | 900 | Allyl chloride | 0.2 | Viscous liquid. |
| 1-K₂ | 900 | _____do_____ | 0.7 | Do. |
| 1-K₃ | 900 | Benzyl chloride | 0.3 | Do. |
| 1-K₄ | 900 | _____do_____ | 0.8 | Solid. |
| 2-K₁ | 5,000 | Methyl chloride | 0.3 | Viscous liquid. |
| 2-K₂ | 5,000 | _____do_____ | 1.0 | Solid. |
| 2-K₃ | 5,000 | Ethylene dichloride | 0.2 | Viscous liquid. |
| 2-K₄ | 5,000 | _____do_____ | 0.5 | Do. |
| 3-K₁ | 11,500 | 1,4-dichlorobutene-2 | 0.2 | Do. |
| 3-K₂ | 11,500 | _____do_____ | 0.5 | Do. |
| 3-K₃ | 11,500 | Dimethyl sulfate | 0.2 | Do. |
| 3-K₄ | 11,500 | _____do_____ | 0.4 | Do. |
| 4-K₁ | 20,000 | Dodecylbenzene chloride | 0.2 | Solid. |
| 4-K₂ | 20,000 | _____do_____ | 0.5 | Do. |
| 4-K₃ | 20,000 | Butyl chloride | 0.3 | Viscous liquid. |
| 4-K₄ | 20,000 | _____do_____ | 0.6 | Do. |
| 5-K₁ | 50,000 | Dichlorodiethyl ether | 0.2 | Do. |
| 5-K₂ | 50,000 | _____do_____ | 0.8 | Solid. |
| 5-K₃ | 50,000 | Benzyl chloride | 0.3 | Viscous liquid. |
| 5-K₄ | 50,000 | _____do_____ | 0.8 | Solid. |
| 6-K₁ | 100,000 | Ethylene dichloride | 0.2 | Viscous liquid. |
| 6-K₂ | 100,000 | _____do_____ | 0.8 | Do. |
| 6-K₃ | 100,000 | Methyl chloride | 0.3 | Do. |
| 6-K₄ | 100,000 | _____do_____ | 1.0 | Solid. |
| 1-A₇K | | 1,4 xylidene chloride | 0.2 | Viscous liquid. |
| 2-A₄K | | _____do_____ | 0.2 | Do. |
| 3-A₃K | | Dodecenyl chloride | 0.2 | Solid. |
| 4-A₂K | | Methyl chloride | 0.5 | Viscous liquid. |
| 6-A₄K | | Benzyl chloride | 0.4 | Solid. |
| 8-A₁K | | Dimethyl sulfate | 0.2 | Viscous liquid. |
| 12-A₂K | | Dichlorodiethyl ether | 0.4 | Do. |
| 1-O₂K | | 1,4-dichlorobutene-2 | 0.3 | Do. |
| 2-O₁K | | Benzyl chloride | 0.4 | Solid. |
| 3-O₂K | | Methyl chloride | 0.7 | Do. |
| 4-O₁K | | Ethylene dichloride | 0.2 | Viscous liquid. |
| 6-O₂K | | Benzyl chloride | 0.4 | Solid. |

TABLE VI.—Continued

| Example | Mol. Wt. PE | Alkylating agent | Mols alkylating agent per mesomer unit | Physical properties |
|---|---|---|---|---|
| 11-O₂K | | Dimethyl sulfate | 0.2 | Viscous liquid. |
| 14-O₁K | | Dichlorodiethyl ether. | 0.4 | Solid. |
| 16-O₄K | | Methyl chloride | 0.6 | Do. |
| 19-O₂K | | Dodecyl benzyl chloride. | 0.2 | Do. |
| 19-O₄K | | 1,4 xylene dichloride. | 0.2 | Viscous liquid. |
| 20-O₁K | | Benzyl chloride | 0.5 | Solid. |
| 22-O₅K | | Methyl chloride | 0.6 | Do. |
| 23-O₄K | | Dodecenyl chloride | 0.2 | Do. |
| 24-O₄K | | Ethylene dichloride | 0.3 | Viscous liquid. |
| 1-A₅O₁K | | 1,4-dichlorobutene-2 | 0.2 | Do. |
| 1-A₅O₅K | | Benzyl chloride | 0.4 | Solid. |
| 5-A₂OK | | Dichlorodiethyl ether. | 0.4 | Do. |
| 12-A₂O₂K | | Methyl chloride | 0.5 | Do. |
| 1-O₁A₁K | | Octadecyl chloride | 0.2 | Do. |
| 2-O₄AK | | Benzyl chloride | 0.4 | Do. |
| 14-O₆AK | | Dichlorodiethyl | 0.3 | Viscous liquid. |
| 22-O₅AK | | Methyl chloride | 0.6 | Do. |
| 26-O₅AK | | Benzyl chloride | 0.6 | Solid. |
| 1-O₂HK | | do | 0.4 | Do. |
| 7-OHK | | Dichlorodiethyl ether. | 0.2 | Viscous liquid. |
| 11-O₁HK | | Ethylene dichloride | 0.2 | Do. |
| 20-O₁HK | | Methyl chloride | 0.5 | Do. |
| 25-O₂HK | | Dimethyl sulfate | 0.2 | Do. |

The following table presents specific illustration of compounds other than polyethyleneimine and its derivatives.

TABLE VI-A.—ACYLATED PRODUCTS

| Example | Mol. Wt. PE | Alkylating agent | Mols alkylating agent per mesomer unit | Physical properties |
|---|---|---|---|---|
| 7-K₁ | 500 | Allyl chloride | 0.2 | Viscous liquid. |
| 7-K₂ | 500 | do | 0.7 | Do. |
| 7-K₃ | 500 | Benzyl chloride | 0.3 | Do. |
| 7-K₄ | 500 | do | 0.8 | Do. |
| 8-K₁ | 1,000 | Methyl chloride | 0.7 | Do. |
| 8-K₂ | 1,000 | do | 1.0 | Do. |
| 8-K₃ | 1,000 | Ethylene dichloride | 0.2 | Do. |
| 8-K₄ | 1,000 | do | 0.5 | Do. |
| 9-K₁ | 5,000 | 1-4-chlorobutene-2 | 0.2 | Do. |
| 9-K₂ | 5,000 | do | 0.5 | Do. |
| 9-K₃ | 5,000 | Dimethyl sulfate | 0.2 | Do. |
| 9-K₄ | 5,000 | do | 0.4 | Do. |
| 10-K₁ | 10,000 | Dodecylbenzene chloride. | 0.2 | Solid. |
| 10-K₂ | 10,000 | do | 0.5 | Do. |
| 10-K₃ | 10,000 | Butyl chloride | 0.3 | Do. |
| 10-K₄ | 10,000 | do | 0.6 | Do. |
| 11-K₁ | 20,000 | Dichlorodiethyl ether. | 0.2 | Do. |
| 11-K₂ | 20,000 | do | 0.8 | Do. |
| 11-K₃ | 20,000 | Benzyl chloride | 0.3 | Do. |
| 11-K₄ | 20,000 | do | 0.8 | Do. |
| 12-K₁ | 40,000 | Methyl chloride | 0.3 | Do. |
| 12-K₂ | 40,000 | do | 0.8 | Do. |
| 12-K₃ | 40,000 | Allyl chloride | 0.5 | Do. |
| 15-A₂K | | Dimethyl sulfate | 0.8 | Viscous liquid. |
| 16-A₃K | | Methyl chloride | 0.3 | Do. |
| 17-A₁K | | Ethylene dichloride | 0.8 | Do. |
| 18-A₃K | | Dichlorodiethyl ether. | 0.2 | Solid. |
| 19-A₂K | | Benzyl chloride | 0.6 | Do. |
| 20-A₁K | | 1-4-dichlorobutene-2 | 0.3 | Do. |
| 27-O₄K | | Dodecenyl chloride | 0.5 | Viscous liquid. |
| 28-O₂K | | Benzyl chloride | 0.2 | Do. |
| 29-O₃K | | 1,4-xylene dichloride. | 1.0 | Do. |
| 36-O₄K | | Dodecyl benzene chloride. | 0.8 | Do. |
| 44-O₅K | | Dimethyl sulfate | 0.3 | Solid. |
| 50-O₂K | | Ethylene dichloride | 0.7 | Do. |
| 51-O₂K | | Butyl chloride | 0.2 | Do. |
| 55-O₃K | | Allyl chloride | 0.5 | Do. |
| 61-O₂K | | Benzyl chloride | 0.3 | Viscous liquid. |
| 15-A₂O₄K | | Methyl chloride | 1.0 | Solid. |
| 19-A₃O₁K | | Ethylene dichloride | 0.6 | Do. |
| 19-A₃O₃K | | Dichloro pentane | 0.5 | Do. |

TABLE VI-A.—Continued

| Example | Mol. Wt. PE | Alkylating agent | Mols alkylating agent per mesomer unit | Physical properties |
|---|---|---|---|---|
| 27-O₂AK | | Dichlorodiethyl ether. | 0.2 | Solid. |
| 44-O₅AK | | Dimethyl sulfate | 1.0 | Do. |
| 51-O₄AK | | Methyl chloride | 0.8 | Do. |
| 46-O₃HK | | Allyl chloride | 0.5 | Do. |
| 20-A₁O₂HK | | Butyl chloride | 0.2 | Do. |

In addition to the above examples wherein a base acceptor is employed to remove the acid anion such as halogen, sulfate, etc., the above examples are also prepared omitting the inorganic base from the reaction medium. When this is done, a halogen containing salt, quaternary, etc. is formed. Examples where such salts are formed will be designated as above except that they will contain an "X" designation for example instead of 1-O₁A₁K they will be 1-O₁A₁KX, and instead of 22-O₅AK they will be 22-O₅AKX, etc. "X" indicates salt formation.

ALKYLATED THEN ACYLATION

The alkylated material prepared above can be further treated with acylating agent where residual acylatable amino groups are still present on the molecule. The acylation procedure is essentially that described above wherein carboxylic acids react with the alkylated polyethyleneimine under dehydrating conditions to form amides and cyclic amidines. The product depends on the ratio of moles of water removed for each carboxylic acid group, i.e., 1 mole water/1 mole carboxylic essentially amides; more than 1 mole water/1 mole carboxylic acid group, essentially cyclic amidines, such as imadazolines.

Such compounds are illustrated in the following table. The symbol employed to designate alkylated, acylated products is "KA" and acylated, alkylated, acylated products is "AKA."

TABLE VII.—ACYLATED, PRIOR ALKYLATED POLYETHYLENEIMINE OR DERIVATIVE

| Example | Acylating agent | Ratio mols acylating agent per mol PE deriv. | Mols of water removed per mole of reactant | Physical properties |
|---|---|---|---|---|
| 1-K₂A | Lauric | 4:1 | 1 | Viscous liquid. |
| 2-K₃A | Oleic | 1:1 | 1.5 | Do. |
| 3-K₁A | Palmitic | 1:1 | 1 | Do. |
| 4-K₁A | Dimeric | 0.5:1 | | Solid. |
| 5-K₁A | Nonanoic | 2:1 | 1 | Viscous liquid. |
| 5-K₂A | Ricinoleic | 2:1 | 1.8 | Do. |
| 5-K₃A | Succinic anhydride alkyl (C₁₂). | 2:1 | 1 | Do. |
| 5-K₄A | Stearic | 1:1 | 1.5 | Solid. |
| 6-K₃A | Myristic | 2:1 | 1 | Viscous liquid. |
| 2-A₄KA | Acetic | 2:1 | 1 | Do. |
| 6-A₄KA | Diglycolic | 1:1 | 1 | Do. |
| 2-O₁KA | Lauric | 2:1 | 1 | Do. |
| 1-O₂KA | Oleic | 2:1 | 1.3 | Do. |
| 1-O₂HKA | Maleic anhydride. | 1:1 | | Solid. |

The following table presents specific illustrations of compounds other than polyethyleneimine and its derivatives.

TABLE VII-A.—ACYLATED, PRIOR ALKYLATED POLYPROPYLENEIMINE OR DERIVATIVE

| Example | Acylating agent | Ratio mols of acylating agent per mol PE deriv. | Mols of water removed per mol of reactant | Physical properties |
|---|---|---|---|---|
| 7-K$_2$A | Myristic | 2:1 | 1 | Viscous liquid. |
| 8-K$_3$A | Acetic | 2:1 | 1 | Do. |
| 9-K$_1$A | Diglycolic | 1:1 | 1 | Do. |
| 10-K$_4$A | Lauric | 2:1 | 1 | Do. |
| 11-K$_2$A | Oleic | 2:1 | 1.3 | Do. |
| 12-K$_1$A | Maleic anhydride | 1:1 | | Solid. |
| 16-A$_3$KA | Lauric | 4:1 | 1 | Viscous liquid. |
| 20-A$_1$KA | Oleic | 1:1 | 1.5 | Do. |
| 28-O$_2$KA | Palmitic | 1:1 | 1 | Do. |
| 44-O$_5$KA | Dimeric | 0.5:1 | 1 | Do. |
| 61-O$_2$KA | Nonanoic | 2:1 | 1 | Do. |
| 15-A$_2$O$_4$KA | Ricinoleic | 2:1 | 1 | Do. |
| 19-A$_3$O$_3$KA | Alkyl succinic anhydride (C-12). | 2:1 | 1.8 | Solid. |
| 44-O$_5$AKA | Stearic | 1:1 | 1 | Viscous liquid. |
| 46-O$_3$HKA | Myristic | 2:1 | 1 | Do. |
| 20-A$_1$O$_2$HKA | Acetic | 1:1 | 1 | Do. |

OLEFINATION

Olefination relates to the reaction of polyethyleneimine and derivatives with olefins.

The compositions of this invention, including polyethyleneimine itself as well as reaction products thereof containing active hydrogens, can be reacted with unsaturated compounds, particular compounds containing activated double bonds, so as to add polyethyleneimine across the double bonds as illustrated herein:

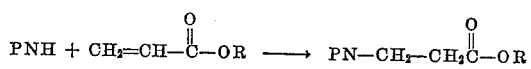

Where the compound contains an additional active hydrogen, other unsaturated molecules can be added to the original molecule for example:

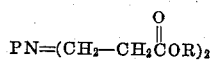

Where one or more active hydrogens are present at another reactive site, the following reaction could take place:

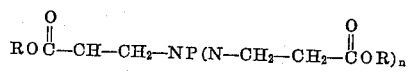

The reaction is carried out in the conventional manner such as illustrated, for example, in "Synthetic Organic Chemistry," Wagner & Zook (Wiley 1953), page 673.

Non-limiting examples of unsaturated compounds which can be reacted with the polyamine and derivatives thereof including the following—acrylonitrile, acrylic and methacrylic acids and esters crotonic acid and esters, cinnamic acid and esters, styrene, styrene derivatives and related compounds, butadiene, vinyl ethers, vinyl ketones, maleic esters, vinyl sulfones, etc.

In addition, polyethyleneimine and derivatives thereof containing active hydrogens can be used to prepare telomers of polymer prepared from vinyl monomers.

The following are examples of olefination. The symbol employed to designate olefination is "U" and alkylation, olefination "KU."

Example 1-U$_1$

The olefination reaction is carried out in the usual glass resin apparatus. Since the reaction is that of a double bond with an active hydrogen, no water is eliminated. The reaction is relatively simple, as shown by the following example:

Charge 900 grams of polyethyleneimine 900 in xylene (1 mol) into glass resin apparatus. Care should be taken that the PEI 900 is water-free, to eliminate undesirable side reactions. At room temperature, slowly add 53 grams of acrylonitrile (1 mol). The reaction proceeds smoothly without the aid of a catalyst. Warm gently to 80–100° C. and stir for one hour.

Example 6-U$_1$

To 1,000 grams of polyethyleneimine 100,000 (0.01 mols) in 300 grams of xylene, add 1.24 grams of divinyl sulfone (0.01 mol) at room temperature. This reaction is exothermic and the ambient temperature is employed.

Example 2-O$_1$KAU

Same reactions as Example 1-U except that 1 mol of methyl acrylate is substituted for acrylonitrile and 2-O$_1$KA is substituted for the polyethyleneimine 900. Part of this product is thereupon saponified with sodium hydroxide to form the fatty amino acid salt.

Further examples of the reaction are summarized in the following table:

TABLE VIII.—OLEFINATION

| Example | Mol. wt. of polyethyleneimine | Olefin | Mols of olefin per mol PE | Time | Temp. ° C. |
|---|---|---|---|---|---|
| 1-U$_1$ | 900 | Acrylonitrile | 1:1 | 1 hr | 80–100 |
| 1-U$_2$ | 900 | Methylacrylate | 2:1 | 1 hr | 80–100 |
| 1-U$_3$ | 900 | Styrene | 3:1 | 2 hrs | 90 |
| 2-U$_1$ | 5,000 | Ethyl cinnamate | 2:1 | 3 hrs | 120 |
| 2-U$_2$ | 5,000 | Ethyl crotonate | 2:1 | 3 hrs | 125 |
| 2-U$_3$ | 5,000 | Dioctyl maleate | 2:1 | 2 hrs | 100 |
| 3-U$_1$ | 11,500 | Divinyl sulfone | 1:1 | 1 hr | 70 |
| 3-U$_2$ | 11,500 | Styrene | 1:1 | 30 min | 90 |
| 3-U$_3$ | 11,500 | Lauryl methacrylate | 2:1 | 3 hrs | 135 |
| 4-U$_1$ | 20,000 | Divinyl sulfone | 1:1 | 1 hr | 80–100 |
| 4-U$_2$ | 20,000 | Methyl methacrylate | 1:1 | 1 hr | 80–100 |
| 4-U$_3$ | 20,000 | Acrylonitrile | 3:1 | 30 min | 80–100 |
| 5-U$_1$ | 50,000 | Methylacrylate | 3:1 | 1 hr | 80–100 |
| 5-U$_2$ | 50,000 | Acrylonitrile | 3:1 | 1 hr | 80–100 |
| 5-U$_3$ | 50,000 | Styrene | 3:1 | 1 hr | 90 |
| 6-U$_1$ | 100,000 | Divinyl sulfone | 1:1 | 1 hr | 70 |
| 6-U$_2$ | 100,000 | Ethyl crotonate | 2:1 | 2 hrs | 125 |
| 6-U$_3$ | 100,000 | Dioctyl maleate | 2:1 | 1 hr | 100 |

TABLE VIII.—Continued

| Example | Olefin | Mols of olefin per mol PE | Time | Temp., ° C. |
|---|---|---|---|---|
| 1-A₆U | Styrene | 1:1 | 1 hour | 90 |
| 2-A₄U | Divinyl sulfone | 1:1 | 1 hour | 70 |
| 3-A₄U | Methylacrylate | 1:1 | 1 hour | 80-100 |
| 6-A₄U | Divinyl sulfone | 1:1 | 1 hour | 70 |
| 8-A₂U | Styrene | 3:1 | 2 hours | 90 |
| 13-A₁U | Dimethyl maleate | 1:1 | 1 hour | 100 |
| 1-O₁U | Dioctyl maleate | 2:1 | 1 hour | 100 |
| 2-O₁U | Ethyl crotonate | 2:1 | 2 hours | 125 |
| 3-O₁U | Divinyl sulfone | 1:1 | 1 hour | 70 |
| 4-O₁U | Styrene | 4:1 | 1 hour | 90 |
| 19-O₁U | Acrylonitrile | 3:1 | 1 hour | 80-100 |
| 20-O₁U | Methylacrylate | 3:1 | 1 hour | 80-100 |
| 22-O₅U | Acrylonitrile | 3:1 | 30 min | 80-100 |
| 23-O₁U | Methyl methacrylate | 1:1 | 1 hour | 80-100 |
| 24-O₁U | Divinyl sulfone | 1:1 | 1 hour | 70 |
| 1-A₅O₁U | Lauryl methacrylate | 2:1 | 3 hours | 135 |
| 23-O₂AU | Divinyl sulfone | 1:1 | 1 hour | 70 |
| 14-O₁HU | Dioctyl maleate | 2:1 | 2 hours | 100 |
| 4-K₄U | Ethyl crotonate | 2:1 | 3 hours | 125 |
| 4-K₄AU | Ethyl cinnamate | 2:1 | 3 hours | 120 |
| 2-A₄KAU | Styrene | 3:1 | 2 hours | 90 |
| 2-O₁KAU | Methylacrylate | 2:1 | 1 hour | 80-100 |
| 1-O₂HKAU | Acrylonitrile | 1:1 | 1 hour | 80-100 |

The following table presents specific illustration of compounds other than polyethyleneimine and its derivatives.

TABLE VIII-A.—OLEFINATION OF POLYPROPYLENEIMINE

| Example | Molecular wt. of polypropyleneimine | Olefin | Mols of olefin per mol of polypropyleneimine | Time in hours | Temp., ° C. |
|---|---|---|---|---|---|
| 7-U₁ | 500 | Styrene | 1:1 | 1 | 90 |
| 7-U₂ | 500 | Divinyl sulfone | 1:1 | 1 | 70 |
| 7-U₃ | 500 | Acrylonitrile | 2:1 | 2 | 80-100 |
| 8-U₁ | 1,000 | Dioctyl maleate | 1:1 | 1 | 120 |
| 8-U₂ | 1,000 | Methylacrylate | 1:1 | 1 | 110 |
| 8-U₃ | 1,000 | Ethyl cinnamate | 3:1 | 2 | 125 |
| 9-U₁ | 5,000 | Lauryl methacrylate | 1:1 | 3 | 130 |
| 9-U₂ | 5,000 | Ethyl crotonate | 1:1 | 3 | 120 |
| 9-U₃ | 5,000 | Acrylonitrile | 4:1 | 1 | 80-100 |
| 10-U₁ | 10,000 | Styrene | 2:1 | 1 | 90 |
| 10-U₂ | 10,000 | Divinyl sulfone | 1:1 | 1 | 80 |
| 10-U₃ | 10,000 | Methylacrylate | 2:1 | 1 | 100 |
| 11-U₁ | 20,000 | Lauryl methacrylate | 2:1 | 3 | 110 |
| 11-U₂ | 20,000 | Styrene | 1:1 | 1 | 90 |
| 11-U₃ | 20,000 | Divinyl sulfone | 2:1 | 2 | 80 |
| 12-U₁ | 40,000 | Methyl acrylate | 1:1 | 2 | 120 |
| 12-U₂ | 40,000 | Acrylonitrile | 3:1 | 1 | 80 |
| 12-U₃ | 40,000 | Dioctyl maleate | 1:1 | 4 | 110 | and other isomeric configurations, such as where the Schiff's base is present on the non-terminal amino group rather than on the terminal amino group, etc.

CARBONYLATION

Carbonylation relates to the reaction of polyethyleneimine and derivatives thereof with aldehydes and ketones.

Where primary amino groups are present on the polyethyleneimine reactants, Schiff's bases can be formed on reaction with carbonyl compounds. For example, where an aldehyde such as salicylaldehyde is reacted with polyethyleneimine 900 in a ratio of 2 moles of aldehyde to 1 mole of PE 900, the following type of compound could be formed:

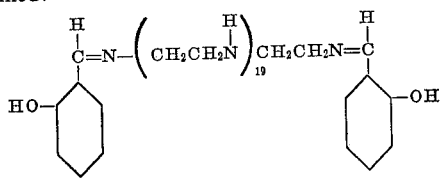

Lesser molar ratios of aldehyde to polyamine would yield mono- Schiff's base such as

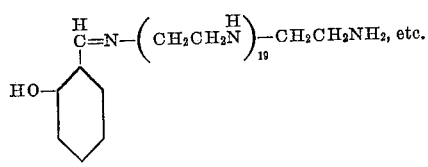

A wide variety of aldehyde may be employed such as aliphatic, aromatic, cycloaliphatic, heterocyclic, etc., including substituted derivatives such as those containing aryloxy, halogen, heterocyclic, amino, nitro, cyano, carboxyl, etc. groups thereof. Non-limiting examples are the following:

*Aldehydes*

Benzaldehyde
2-methylbenzaldehyde
3-methylbenzaldehyde
4-methylbenzaldehyde
2-methoxybenzaldehyde
4-methoxybenzaldehyde
a-naphthaldehyde
b-naphthaldehyde
4-phenylbenzaldehyde
Propionaldehyde
n-Butyraldehyde
Heptaldehyde
Aldol
2-hydroxybenzaldehyde
2-hydroxy-6-methylbenzaldehyde
2-hydroxy-3-methoxybenzaldehyde
2-4-dihydroxybenzaldehyde
2-6-dihydroxylbenzaldehyde
2-hydroxynaphthaldehyde-1
1-hydroxynaphthaldehyde-2

*Aldehydes.*—Continued

Anthrol-2-aldehyde-1
2-hydroxyfluorene-aldehyde-1
4-hydroxydiphenyl-aldehyde-3
3-hexydroxyphenanthrene-aldehyde-4
1-3-dihydroxy-2-4-dialdehydebenzene
2-hydroxy-5-chlorobenzaldehyde
2-hydroxy-3:5-dibromobenzaldehyde
2-hydroxy-3-nitrobenzaldehyde
2-hydroxy-3-cyanobenzaldehyde
2-hydroxy-3-carboxybenzaldehyde
4-hydroxypyridine-aldehyde-3
4-hydroxyquinoline-aldehyde-3
7-hydroxyquinoline-aldehyde-8
formaldehyde
glyoxal
glyceraldehyde Schiff's bases are prepared with the polyethyleneimines of this invention in a conventional manner such as described in "Synthetic Organic Chemistry" by Wagner & Zook (1953 Wiley), page 728–9.

Where more extreme conditions are employed, the products may be more complex wherein the carbonyl reactant instead of reacting intramolecularly in the case of a Schiff's base may react intermolecularly so as to act as a bridging means between two or more polyethyleneimine compounds, thus increasing the molecular weight of the polyethyleneimine as schematically shown below in the case where formaldehyde is the carbonyl compound:

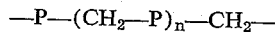

$$-P-(CH_2-P)_n-CH_2-$$

In addition to increasing the molecular weight by means of aldehydes, these compounds result in the formation of cyclic compounds. Probably both molecular weight increase and cyclization occur during the reaction.

The following examples illustrate the reaction of carbonyl compounds with polyethyleneimines. The symbol employed to designate carbonylation is "C," acylation, carbonylation "AC," and alkylation, carbonylation "KC."

*Examples 1–$C_1$*

Charge 900 grams of polyethyleneimine 900 and 900 grams of xylene into a conventional glass resin apparatus fitted with a stirrer, thermometer and side-arm trap. Raise temperature to 90° C. and slowly add 44 grams of acetaldehyde (1 mol). Hold at this temperature for three hours. Vacuum is then applied until all xylene is stripped off. The reaction mass is a thick dark liquid which is soluble in water.

*Example 5–$C_1$*

Using the same apparatus as above, charge 500 g. (0.1) of polyethyleneimine 5,000. While stirring, add slowly at room temperature 8.2 grams of 37% aqueous formaldehyde (0.1 mol of HCHO). After the reaction has ceased, raise temperature to 100° C. The reaction mass may be stopped at this point. It is a viscous water-soluble material. However, it is possible to continue heating under vacuum until all of the water has been eliminated. Cross-linking occurs with this procedure and care must be taken to prevent insolubilization.

Further examples of this reaction are summarized in the following table:

TABLE IX.—CARBONYLATION

| Example | Mol. wt. of polyethyleneimine | Aldehyde | Mol ratio aldehyde to polyethyleneimine or deriv. | Temp., ° C. | Time |
|---|---|---|---|---|---|
| 1-$C_1$ | 900 | Acetaldehyde | 1:1 | 90 | 3 hours. |
| 1-$C_2$ | 900 | do | 2:1 | 90 | Do. |
| 1-$C_3$ | 900 | do | 3:1 | 90 | Do. |
| 2-$C_1$ | 5,000 | Heptaldehyde | 1:1 | 125 | 4 hours. |
| 2-$C_2$ | 5,000 | do | 5:1 | 125 | Do. |
| 2-$C_3$ | 5,000 | do | 3:1 | 125 | Do. |
| 3-$C_1$ | 11,500 | Glyoxal | 1:1 | 80 | 1 hour. |
| 3-$C_2$ | 11,500 | do | 2:1 | 80 | Do. |
| 3-$C_3$ | 11,500 | do | 0.5:1 | 80 | Do. |
| 4-$C_1$ | 20,000 | Salicylaldehyde | 6:1 | 140 | 3 hours. |
| 4-$C_2$ | 20,000 | do | 5:1 | 140 | Do. |
| 4-$C_3$ | 20,000 | do | 3:1 | 140 | Do. |
| 5-$C_1$ | 50,000 | Formaldehyde | 3:1 | (¹) | 1 hour. |
| 5-$C_2$ | 50,000 | do | 2:1 | (¹) | Do. |
| 5-$C_3$ | 5,000 | do | 2:1 | (¹) | Do. |
| 6-$C_1$ | 100,000 | Glyceraldehyde | 6:1 | 125 | 5 hours. |
| 6-$C_2$ | 100,000 | do | 3:1 | 125 | Do. |
| 6-$C_3$ | 100,000 | do | 2:1 | 125 | Do. |
| 1-$A_7C$ | 100,000 | Salicylaldehyde | 3:1 | 120 | 2 hours. |
| 2-$A_4C$ | 100,000 | do | 2:1 | 120 | Do. |
| 4-$A_3C$ | 100,000 | do | 1:1 | 120 | Do. |
| 6-$A_4C$ | 100,000 | Benzaldehyde | 3:1 | 110 | 1 hour. |
| 8-$A_3C$ | 100,000 | do | 2:1 | 110 | Do. |

| Example | Aldehyde | Mol ratio aldehyde to polyethyleneimine | Temp., ° C. | Time |
|---|---|---|---|---|
| 1-$O_1C$ | Benzaldehyde | 1:1 | 110 | 1 hour. |
| 2-$O_1C$ | Glyoxal | 3:1 | 100 | 2 hours. |
| 3-$O_1C$ | do | 2:1 | 100 | Do. |
| 19-$O_1C$ | do | 1:1 | 100 | Do. |
| 20-$O_1C$ | Formaldehyde | 3:1 | (²) | 1 hour. |
| 22-$O_5C$ | do | 2:1 | (²) | Do. |
| 1-$A_5O_1C$ | do | 1:1 | (²) | Do. |
| 1-$A_5O_6C$ | Glyceraldehyde | 3:1 | 130 | 4 hours. |
| 6-$A_4OC$ | do | 2:1 | 130 | Do. |
| 12-$O_2AC$ | Furfuraldehyde | 3:1 | 100 | 1 hour. |
| 17-$O_3AC$ | do | 2:1 | 100 | Do. |
| 26-$O_1AC$ | do | 1:1 | 100 | Do. |
| 1-$O_2HC$ | Heptaldehyde | 3:1 | 140 | 6 hours. |
| 1-$K_1C$ | do | 2:1 | 140 | Do. |
| 5-$K_2C$ | do | 1:1 | 140 | Do. |
| 1-$K_2AC$ | Formaldehyde | 3:1 | (²) | 1 hour. |
| 5-$U_1C$ | do | 2:1 | (²) | Do. |
| 3-$O_1UC$ | do | 1:1 | (²) | Do. |

¹ Start at 25° C.; raise to 100° C.
² Start at 25° C., raise to 90° C.

TABLE IX-A.—CARBONYLATION

| Example | Mol. wt. of polypropyleneimine | Aldehyde | Mol. ratio aldehyde to polypropyleneimine | Temp., °C | Time in Hours |
|---|---|---|---|---|---|
| 7-C$_1$ | 500 | Benzaldehyde | 1:1 | 110 | 1 hour. |
| 7-C$_2$ | 500 | do | 2:1 | 110 | Do. |
| 7-C$_3$ | 500 | do | 3:1 | 110 | Do. |
| 8-C$_1$ | 1,000 | Salicylaldehyde | 4:1 | 120 | Do. |
| 8-C$_2$ | 1,000 | do | 3:1 | 120 | Do. |
| 8-C$_3$ | 1,000 | do | 2:1 | 120 | Do. |
| 9-C$_1$ | 5,000 | Formaldehyde | 2:1 | 90 | Do. |
| 9-C$_2$ | 5,000 | do | 1:1 | 90 | Do. |
| 9-C$_3$ | 5,000 | do | 0.5:1 | 90 | Do. |
| 10-C$_1$ | 10,000 | Glyoxal | 2:1 | 90 | Do. |
| 10-C$_2$ | 10,000 | do | 1:1 | 90 | Do. |
| 10-C$_3$ | 10,000 | do | 0.5:1 | 90 | Do. |
| 11-C$_1$ | 20,000 | Acetaldehyde | 3:1 | 100 | 2 hours. |
| 11-C$_2$ | 20,000 | do | 2:1 | 100 | Do. |
| 11-C$_3$ | 20,000 | do | 1:1 | 100 | Do. |
| 12-C$_1$ | 40,000 | Heptaldehyde | 4:1 | 130 | 3 hours. |
| 12-C$_2$ | 40,000 | do | 3:1 | 130 | Do. |
| 12-C$_3$ | 40,000 | do | 2:1 | 130 | Do. |

| Example | Aldehyde | Mol ratio of aldehyde to polypropyleneimine or derivative | Temp., °C | Time in hours |
|---|---|---|---|---|
| 15-A$_3$C | Glyceraldehyde | 3:1 | 125 | 4 |
| 18-A$_3$C | Heptaldehyde | 2:1 | 125 | 4 |
| 20-A$_2$C | Furfuraldehyde | 1:1 | 100 | 2 |
| 27-O$_1$C | Glyoxal | 1:1 | 90 | 1 |
| 28-O$_2$C | Benzaldehyde | 4:1 | 120 | 2 |
| 29-O$_3$C | Formaldehyde | 1:1 | (1) | 1 |
| 43-O$_2$C | Acetaldehyde | 1:1 | 100 | 2 |
| 15-A$_3$O$_2$C | do | 2:1 | 100 | 2 |
| 20-A$_1$O$_2$C | do | 3:1 | 100 | 2 |
| 32-O$_4$AC | Salicylaldehyde | 1:1 | 130 | 3 |
| 51-O$_4$AC | do | 2:1 | 130 | 3 |
| 32-O$_1$HC | do | 3:1 | 130 | 3 |
| 15-A$_2$O$_1$HC | Benzaldehyde | 3:1 | 125 | 2 |
| 8-K$_4$C | do | 2:1 | 125 | 2 |
| 12-K$_2$C | do | 1:1 | 125 | 2 |
| 10-K$_4$AC | Glyoxal | 2:1 | 100 | 1 |
| 61-O$_2$KAC | do | 1:1 | 100 | 1 |
| 20-A$_1$O$_2$KAC | do | 0.5:1 | 100 | 1 |
| 7-U$_2$C | Formaldehyde | 2:1 | 70 | 1 |
| 12-U$_3$C | do | 1:1 | 70 | 1 |

$^1$ Start at 25° C., raise to 100° C.

The above table presents specific illustration of compounds other than polyethyleneimine and its derivatives.

The examples presented above are non-limiting examples. It should be clearly understood that various other combinations, order of reactions, reaction ratios, multiplicity of additions, etc., can be employed. Where additional reactive groups are still present on the molecule, the reaction can be repeated with either the original reactant or another reactant.

The type of compound prepared as evident from the letters assigned to the examples. Thus, taking the branched polyamine as the starting material, the following example designations have the following meaning:

| Example designation: | | Meaning |
|---|---|---|
| (1) | A | Acylated. |
| (2) | AO | Acylated, then oxyalkylated. |
| (3) | AOA | Acylated, then oxyalkylated, then acrylated. |
| (4) | AOH | Acylated, then oxyalkylated, then heat treated. |
| (5) | AX | Salt or quaternary of (1). |
| (6) | AOX | Salt or quaternary of (2). |
| (7) | AOAX | Salt or quaternary of (3). |
| (8) | AOHX | Salt or quaternary of (4). |
| (9) | O | Oxyalkylated. |
| (10) | OA | Oxyalkylated, then acylated. |
| (11) | OH | Oxyalkylated, then heat treated. |
| (12) | K | Alkylated. |
| (13) | KX | Salt or quaternary of (12). |
| (14) | KA | Alkylated, then acylated. |
| (15) | AK | Acylated, then alkylated. |
| (16) | AKX | Salt or quaternary of (15). |
| (17) | OK | Oxyalkylated, then alkylated. |
| (18) | OKX | Salt or quaternary of (17). |
| (19) | C | Carbonylated. |
| (20) | AC | Acylated, then carbonylated. |
| (21) | KC | Alkylated, then carbonylated. |
| (22) | CO | Carbonylated, then oxyalkylated. |
| (23) | U | Olefinated. |
| (24) | AU | Acylated, then olefinated. |
| (25) | KU | Alkylated, then olefinated. |
| (26) | KUX | Salt or quaternary of (25). |

In addition to polyethyleneimine itself, other polyalkyleneimines can be employed, a typical example of which is polypropyleneimines. Propyleneimine is now commercially available and can be polymerized to the polymer and polypropyleneimine can then be reacted in a manner similar to those reactions shown above. Thus, the teachings contained herein also apply to other polyalkyleneimines besides polyethyleneimine and derivatives thereof.

USE AS A CHELATING AGENT

This phase of the invention relates to the use of the compounds of our invention as chelating agents and to the chelates thus formed.

Chelation is a term applied to designate cyclic structures arising from the combination of metallic atoms with organic or inorganic molecules or ions. Chelates are very important industrially because one of the unusual features of the chelate ring compounds is their unusual stability in which respect they resemble the aromatic rings of organic chemistry. Because of the great affinity of chelating compounds for metals and because of the great stability of the chelates they form, they are very important industrially.

The compositions of this invention are excellent chelating agents. They are particularly suitable for forming chelates of great stability with a wide variety of metals. Chelating metals comprise magnesium, aluminum, arsenic, antimony, chromium, iron, cobalt, nickel, palladium, and platinum. Particularly preferred of such metals as chelate constituents are iron, nickel, copper and cobalt.

The chelates formed from the compositions of our invention are useful as bactericidal and fungicidal agents, particularly in the case of the copper chelates. In addition the chelates can be employed to stabilize hydrocarbon oils against the deleterious effects of oxidation.

In general, these chelates are prepared by adding a sufficient amount of a metal salt to combine with a compound to this invention. They are prepared by the general method described in detail by Hunter and Marriott in the Journal of the Chemical Society (London) 1937, 2000, which relates to the formation of chelates from metal ions and salicylidene imines.

The following examples are illustrative of the preparation of chelates.

Example 1–$A_7$

An aqueous 0.1 mole solution of the chelating agent of Example 1–$A_7$ is added to an aqueous solution of 0.02 mole cupric acetate. The solution becomes darker in blue color immediately with the formation of the copper chelate. Inability of the solution to plate out copper on a clean and polished iron strip indicates that the copper is effectively removed from the solution by the formation of a chelate.

Example 1–$O_2$

An aqueous solution of 0.1 mole of the chelating agent of Example 1–$O_2$ is added to an aqueous solution containing 0.025 mole ferrous sulfate. Lack of the usual formation of a red sediment in the water subsequently due to oxidation and precipitation of iron as hydrated oxide shows the iron had been chelated while in the ferrous form by the reagent 1–$O_2$ and thus effectively removed from further reactions.

Example 1–$A_5O_1$

An aqueous solution of 0.1 mole of the chelating agent 1–$A_5O_1$ is treated with an aqueous solution containing 0.01 mole nickelous acetate. The solution turns to a darker green indicating that a chelate type of material had been formed.

To avoid repetitive detail, chelates are formed from the above copper, iron and nickel salts and the compounds shown in the following table.

CHELATING AGENTS

| Polyethyleneimine, molecular wt. | 900 |
|---|---|
| Do | 5,000 |
| Do | 11,500 |
| Do | 20,000 |
| Do | 50,000 |
| Do | 100,000 |

| | |
|---|---|
| 1–$A_7$ | 16–$O_4H$ |
| 1–$O_2$ | 4–$K_1$ |
| 10–$O_1$ | 5–$K_1$ |
| 16–$O_1$ | 5–$K_3$ |
| 19–$O_1$ | 6–$K_2$ |
| 20–$O_1$ | 20–$O_1KX$ |
| 22–$O_5$ | 1–$K_2A$ |
| 1–$A_5O_1$ | 1–$O_2HKA$ |
| 24–$O_4A$ | 6–$U_1$ |
| 1–$O_2H$ | |

CHELATING AGENTS

| Polypropyleneimine, molecular weight | 500 |
|---|---|
| Do | 1,000 |
| Do | 5,000 |
| Do | 10,000 |
| Do | 20,000 |
| Do | 40,000 |

| | |
|---|---|
| 15–$A_1$ | 17–$H_3O_2H$ |
| 19–$A_2$ | 9–$K_3$ |
| 27–$O_1$ | 12–$K_2$ |
| 39–$O_1$ | 61–$O_2K$ |
| 44–$O_2$ | 46–$O_2HK$ |
| 47–$O$ | 8–$K_3A$ |
| 55–$O_2$ | 7–$K_2A$ |
| 15–$A_2O_3$ | 61–$O_2KA$ |
| 20–$A_1O_2$ | 8–$U_2$ |
| 28–$O_3A$ | 11–$U_3$ |
| 62–$O_2A$ | 10–$C_2$ |
| 27–$O_3H$ | 15–$A_2O_1HC$ |

BREAKING AND PREVENTING WATER-IN-OIL EMULSIONS

This phase of the invention relates to the use of the products of the present invention in preventing, breaking or resolving emulsions of the water-in-oil type, and particularly petroleum emulsions. Their use provides an economical and rapid process for resolving petroleum emulsions of the water-in-oil type that are commonly referred to as "cut oil," "roily oil," "emulsified oil," etc., and which comprise fine droplets of naturally-occurring waters or brines dispersed in a more or less permanent state throughout the oil which constitutes the continuous phase of the emulsion.

They also provide an economical and rapid process for separating emulsions which have been prepared under controlled conditions from mineral oil, such as crude oil and relatively soft waters or weak brines. Controlled emulsification and subsequent demulsification, under the conditions just mentioned, are of significant value in removing impurities, particularly inorganic salts, from pipeline oil, (i.e., desalting).

Demulsification, as contemplated in the present application, includes the preventive step of commingling the demulsifier with the aqueous component which would or might subsequently become either phase of the emulsion in the absence of such precautionary measure. Similarly, such demulsifier may be mixed with the hydrocarbon component.

These demulsifying agents employed in the treatment of oil field emulsions are used as such, or after dilution with any suitable solvent, such as water, petroleum hydrocarbons, such as benzene, toluene, xylene, tar acid oil, cresol, anthracene oil, etc. Alcohols, particularly aliphatic alcohols, such as methyl alcohol, ethyl alcohol, denatured alcohol, propyl alcohol, butyl alcohol, hexyl alcohol, octyl alcohol, etc., are often employed as diluents. Similarly, the material or materials employed as the demulsifying agents of this process are often admixed with one or more of the solvents customarily used in connection with conventional demulsifying agents. Moreover, said material or materials are often used alone or in admixture with other suitable well-known classes of demulsifying agents.

These demulsifying agents are useful in a water-soluble form, or in an oil-soluble form, or in a form exhibiting both oil and water-solubility. Sometimes they are used in a form which exhibit relatively limited oil-solubility. However, since such reagents are frequently used in a ratio of 1 to 10,000, or 1 to 20,000, or 1 to 30,000, or even 1 to 40,000 or 1 to 50,000 as in desalting practice, such an apparent insolubility in oil and water is not significant, because said reagents undoubtedly have solubility within such concentrations.

In practicing the process for resolving petroleum emulsions of the water-in-oil type, a treating agent or demulsifying agent of the kind above described is brought into contact with or caused to act upon the emulsion to be treated, in any of the various apparatus now generally used to resolve or break petroleum emulsions with a chemical reagent, the above procedure being used alone or in combination with other demulsifying procedure, such as the electrical dehydration process.

One type of procedure is to accumulate a volume of emulsified oil in a tank and conduct a batch treatment type of demulsification procedure to recover clean oil. In this procedure the emulsion is admixed with the demulsifier, for example by agitating the tank of emulsion and slowly dripping demulsifier into the emulsion. In some cases mixing is achieved by heating the emulsion while dripping in the demulsifier, depending upon the convection currents in the emulsion to produce satisfactory admixture. In a third modification of this type of treatment, a circulating pump withdraws emulsion from, e.g. the bottom of the tank, and re-introduces it into the top of the tank, the demulsifier being added, for example, at the suction side of said circulating pump.

In second type of treating procedure, the demulsifier is introduced into the well fluids at the well-head or at some point between the well-head and the final oil storage tank, by means of an adjustable proportioning mechanism or proportioning pump. Ordinarily the flow of fluids through the subsequent lines and fittings suffices to produce the desired degree of mixture of demulsifier and emulsion, although in some instances additional mixing devices may be introduced into the flow system. In this general procedure, the system may include various mechanical devices for withdrawing free water, separating entrained water, or accomplishing quiescent settling of the chemicalized emulsion. Heating devices may likewise be incorporated in any of the treating procedures described herein.

A third type of application (down-the-hole) of demulsifier to emulsion is to introduce the demulsifier either periodically or continuously in diluted or undiluted form into the well and to allow it to come to the surface with the well fluids, and then to flow the chemicalized emulsion through any desirable surface equipment, such as employed in the other treating procedures. This particular type of application is decidedly useful when the demulsifier is used in connection with acidification of calcareous oil-bearing strata, especially if suspended in or dissolved in the acid employed for acidification.

In all cases, it will be apparent from the foregoing description, the broad process consists simply in introducing a relatively small proportion of demulsifier into a relatively large proportion of emulsion, admixing the chemical and emulsion either through natural flow or through special apparatus, with or without the application of heat, and allowing the mixture to stand quiescent until the desirable water content of the emulsion separates and settles from the mass.

The following is a typical installation:

A reservoir to hold the demulsifier of the kind described (diluted or undiluted) is placed at the well-head where the effluent liquids leave the well. This reservoir or container, which may vary from 5 gallons to 50 gallons for convenience, is connected to a proportioning pump which injects the demulsifier drop-wise into the fluids leaving the well. Such chemicalized fluids pass through the flow-line into a settling tank. The settling tank consists of a tank of any convenient size, for instance, one which will hold amouts of fluid produced in 4 to 24 hours (500 barrels to 2000 barrels capacity), and in which there is a perpendicular conduit from the top of the tank to almost the very bottom so as to permit the incoming fluids to pass from the top of the settling tank to the bottom, so that such incoming fluids do not disturb stratification which takes place during the course of demulsification. The settling tank has two outlets, one being below the water level to drain off the water resulting from demulsification or accompanying the emulsion as free water, the other being an outlet at the top to permit the passage of dehydrated oil to a second tank, being a storage tank, which holds pipeline or dehydrated oil. If desired, the conduit or pipe which serves to carry the fluids from the well to the settling tank may include a section of pipe with baffles to serve as a mixer, to insure thorough distribution of the demulsifier throughout the fluids, or a heater for raising the temperature of the fluids to some convenient temperature, for instance, 120° to 160° F., or both heater and mixer.

Demulsification procedure is started by simply setting the pump so as to feed a comparatively large ratio of demulsifier, for instance, 1:5,000. As soon as a complete "break" or satisfactory demulsification is obtained, the pump is regulated until experience shows that the amount of demulsifier being added is just sufficient to produce clean or dehydrated oil. The amount being fed at such stage is usually 1:10,000, 1:15,000, 1:20,000, of the like. However, with extremely difficult emulsions higher concentrations of demulsifier can be employed.

In many instances the products herein specified as demulsifiers can be conveniently used without dilution. However, as previously noted, they may be diluted as desired with any suitable solvent. Selection of the solvent will vary, depending upon the solubility characteristics of the product, and, of course, will be dictated in part by economic consideration, i.e., cost. The products herein described are useful not only in diluted form but also admixed with other chemical demulsifiers.

In recent years pipe line standards for oil have been raised so that an effective demulsifier must not only be able to break oil field emulsions under conventional conditions without sludge, but at the same time it must also yield bright pipeline oil, i.e., pipeline oil that is free from the minute traces of foreign matter, whether suspended water or suspended emulsion droplets due to nonresolvable solids. In addition the water phase should be free of oil so as not to create a disposal problem. Thus it is presently desirable to use a demulsifier that produces absolutely bright, haze-free oil in the top layer, yields little or no interphasal sludge, and has little if any oil in the water phase.

The following examples show results obtained in the resolution of crude petroleum emulsions obtained from various sources.

EXAMPLES

These compounds are tested on water-in-oil emulsions from many areas, the emulsions selected on the basis that they are particularly resistant to treatment. For testing procedure see U.S. Patent 2,626,929 to De Groote.

A field trial is run on compound $1-A_5O_4$ at the Shell Oil Company, Pasuncula Lease, San Joaquin Valley, Calif. This system is unusually difficult to demulsify due to a large number of gas lift wells producing highly emulsified oil. One part of demulsifier resolves approximately 30,000 parts of emulsion. The effluent water from the heater is free from oil and solids.

Similarly, demulsification is effected by employing the compounds shown in the following table on emulsions taken from the following leases:

(1) Texaco Oil Company, Hammond Lease, Gato Ridge, Calif. This oil gravity is 9.1° API and requires a temperature of 170–180° F. to break the emulsion.

(2) Morton-Kohlbush Oil Company, Composite, Torrance, Calif. This emulsion broke to 25% water.

(3) Christiana Oil Company, Hayes #1, Wilmington, Calif. This oil has a gravity of 14.2° API. The emulsion breaks to 34% water. This water has a salivity of 2,127 grains per gallon.

(4) Shell Oil Company, Lease 10–4, Dominquez, Calif. The test temperature was 90° F. Chemical is added at a ratio of 1 to 8000. Water content 20%.

(5) Huntington State Oil Company, Reading #1

Lease, Huntington Beach, Calif. This emulsion contained 38% water.

Demulsification was also effective in other areas such as in Texas, Oklahoma, Ill., the Rocky Mountain States, Wyoming, etc.

The following compositions are exemplary of effective demulsifiers:

WATER-IN-OIL DEMULSIFIERS

| | |
|---|---|
| 2–$A_3$ | 15–$O_6H$ |
| 6–$A_2$ | 4–$K_1$ |
| 10–$A_2$ | 5–$K_2A$ |
| 2–$O_3$ | 1–$O_2HKA$ |
| 4–$O_4$ | 5–$U_2$ |
| 10–$O_3$ | 4–$O_1U$ |
| 18–$O_5$ | 23–$O_2AU$ |
| 1–$A_5O_4$ | 1–$O_2HKAU$ |
| 12–$A_2O_1$ | 5–$C_2$ |
| 15–$O_3A$ | 6–$C_1$ |
| 25–$A_3O_1$ | 6–$C_3$ |

WATER-IN-OIL DEMULSIFIERS

| | |
|---|---|
| Polypropyleneimine, molecular weight | 500 |
| Do | 1,000 |
| Do | 5,000 |
| Do | 10,000 |
| Do | 20,000 |
| Do | 40,000 |

| | |
|---|---|
| 15–$A_1$ | 44–$O_5A$ |
| 17–$A_1$ | 27–$O_3H$ |
| 19–$A_3$ | 17–$A_3O_2H$ |
| 28–$O_5$ | 11–$K_3$ |
| 29–$O_4$ | 12–$K_1A_2$ |
| 31–$O_2$ | 28–$O_2KA$ |
| 32–$O_3$ | 20–$A_1O_2HKA$ |
| 41–$O$ | 11–$U_1$ |
| 44–$O_5$ | 12–$U_3$ |
| 51–$O_4$ | 12–$C_2$ |
| 61–$O_3$ | 15–$A_3C$ |
| 17–$A_3O_1$ | 43–$O_2C$ |
| 19–$A_3O_3$ | 10–$K_4AC$ |
| 27–$O_2A$ | 7–$U_2C$ |

PREVENTION OF EMULSIONS IN OILS DURING TRANSIT

Because of their demulsification properties the compounds of this invention are also useful in preventing the formation of emulsions during transit.

Often oil which meets specifications when shipped arrives emulsified at its destination when extraneous water becomes mixed with the oil during transit through pipe lines, storage in tanks during transportation in seagoing tankers and the like.

For example, as is well known in a number of places where petroleum is produced containing a minimum amount of foreign matter and is completely acceptable for refinery purposes prior to shipment, it is not acceptable after a shipment has been made, for instance, thousands of miles by tanker. The reason is that an empty tanker employs sea water for ballast prior to reloading and it is almost impossible to remove all ballast sea water before the next load starts. In some instances a full tanker may use sea water for ballast also. In other instances, due to seepage, etc., contamination takes place. The rolling or rocking effect of the sea voyage seems to give all the agitation required. It is to be noted that the emulsion, generally a water-in-oil type, so produced is characterized by the fact that the dispersed phase is sea water.

Typical examples are shipments of oil from the Near East to Japan, Australia, etc., and various quantities shipped to the west coast of the U.S.A. and, for that matter, to the east coast of the U.S.A.

The presence of water in petroleum distillate fuels often results in emulsion formation especially when such water-containing fuels are subjected to agitation or other conditions promoting emulsification. Unless such emulsion formation is retarded or emulsions that have been formed are resolved so as to permit separation of water from the fuel, the water entering the fuel system deleteriously affects the performance of the system, particularly mechanisms therein of ferrous metals with which the water-containing fuel comes into contact.

As an example, serious difficulties arise in marine operations when salt water, in amounts even as low as 0.01% by weight of a diesel fuel, enters diesel engines. The presence of water in the fuel enhances emulsification thereof and some of the emulsion normally passes through filtering media in the same manner as the fuel that has not been emulsified and, as a result, rapid engine failures often occur. Such failures are often due to corrosion of metal surfaces, as is manifested by surface pitting and formation of fatigue cracks on machined parts, to deleterious effects on fuel injectors resulting in broken or completely disintegrated check valve springs, to promotion of seizure of plungers in bushings and general corrosion of metal surfaces that are contacted by the water-containing fuel. Accordingly, the presence of water in petroleum distillate fuels, and particularly in diesel fuels, is highly undesirable and means are generally employed to separate the water, often in emulsified form, from the fuel. When the water present in the fuel is in emulsified form, one method for treating the emulsion to prevent water from entering the system is to break the emulsion and separate water from the fuel. As manufactured, petroleum distillates suitable for use as fuels are normally water free or contain not more than a trace of water and, hence, such distillates per se present little, if any, difficulty from emulsification unless extraneous water becomes admixed therewith.

In illustration reference is made to a current Navy Department Specification for diesel fuels which, in listing the chemical and physical requirements for conformance therewith, sets forth that the diesel fuels must not contain more than a trace, as a maximum, of water and sediment. Nevertheless, and in the handling of such fuels through pipelines, storage thereof in tanks, and during transportation such as in seagoing tankers, extraneous water oftentimes becomes admixed with the fuel thereby providing difficulties inclusive of those aforesaid.

Oil in transit can be effectively inhibited against emulsification by adding a small amount, i.e., sufficient to substantially reduce the tendency of the fuel to emulsify, of the demulsifiers described above.

In practicing this phase of the invention, the contemplated demulsifiers may be added in desired amounts to a fuel oil that has emulsified as a result of water having become admixed therewith or may be added to a fuel oil to suppress emulsification thereof when such oils are subsequently exposed to conditions promoting emulsification by admixture of water therewith. For such purposes, the demulsifiers of the present invention may be employed per se, in mixtures thereof, or in combination with a suitable vehicle e.g., a petroleum fraction, to form a concentrated solution or dispersion for addition to the fuels to be treated. For example, when it is desired to add the demulsifying agent in the form of a concentrated solution or dispersion, it is preferably that such a solution or dispersion be prepared by employing a vehicle that is compatible with and does not deleteriously affect the performance of the petroleum distillate fuel to be treated. Hence, particularly suitable vehicles for preparing concentrated solutions or dispersions of the demulsifying agents include petroleum fractions similar to or identical to the petroleum distillate fuel to be treated in accordance with this invention.

In illustration, such concentrates may comprise a petroleum distillate or other suitable liquid hydrocarbon in admixture with a demulsifier as embodied herein and wherein the demulsifier is present in an amount of about 10 to 75% or higher but preferably 25 to 50% based on the weight of the concentrate. As specific illustrations, such concentrates may comprise a suitable hydrocarbon vehicle, e.g., diesel fuels, kerosenes, semi-aromatic fractions and other mineral oil fractions, in which there is dissolved or dispersed a demulsifier in amounts varying from about 10 to 75% by weight of the concentrate, and, in still more specific illustration, a suitable concentrate comprising about 50% by weight of demulsifier in admixture with a petroleum hydrocarbon.

In practice, the general procedure is either to add the compound of this invention at the refinery or at the loading dock using a proportional pump. The pumping device adds the product so that it is entirely mixed and thus insures that the cargo oil meets all the required specifications on arrival.

The amount of active emulsion preventive added will vary depending upon many factors, for example, the fuel oil, the amount of agitation encountered, the amount of water, etc. In most cases suitable results are obtained employing 10–75 p.p.m. of demulsifier to oil but preferably 25–50 p.p.m. In certain oils, the lower concentrations are satisfactory whereas with certain more readily emulsifiable oils, the higher concentrations are desirable.

In order further to describe this phase of the invention, several of the test compositions are prepared by dissolving 40 p.p.m. of the following compounds of this invention in a diesel fuel, mixing the thus prepared solution with an equal amount of either distilled water or synthetic sea water, and subjecting the resulting admixtures to stirring at the rate of 1500 revolutions per minute. Blanks are prepared by mixing the diesel fuel with distilled water or synthetic sea water in equal amounts. The test compositions containing no demulsifier form emulsions which persist for long periods of time after stirring is stopped. Test compositions containing the compounds shown in the following table either do not emulsify or the emulsions are completely resolved within a short time after stirring is stopped.

EMULSION PREVENTIVE FOR OIL DURING TRANSIT

| | |
|---|---|
| 1–$A_5$ | 19–$O_2K$ |
| 4–$A_2$ | 5–$K_3X$ |
| 6–$A_3$ | 6–$K_3A$ |
| 9–$A_2$ | 5–$U_2$ |
| 10–$A_1$ | 17–$A_2$ |
| 14–$A_2$ | 20–$A_3$ |
| 1–$O_6$ | 28–$O_6$ |
| 2–$O_5$ | 29–$O_5$ |
| 14–$O_5$ | 31–$O_2$ |
| 17–$O_2$ | 35–$O$ |
| 1–$A_5O_4$ | 18–$A_3O$ |
| 11–$A_3O_2$ | 39–$O_2A$ |
| 13–$O_3A$ | 56–$O_4H$ |
| 25–$O_3A_2$ | 10–$K_2$ |
| 26–$O_6A$ | 19–$A_3O_3KA$ |
| 17–$O_1H$ | 9–$U_1$ |
| 3–$K_1$ | 10–$C_2$ |
| 5–$K_4$ | 20–$A_1O_2C$ |

BREAKING OIL-IN-WATER-EMULSIONS

This phase of the invention relates to the use of the products of this invention in a process for preventing, resolving or separating emulsions of the oil-in-water class.

Emulsions of the oil-in-water class comprise organic oily materials, which, although immiscible with water or aqueous or non-oily media, are distributed or dispersed as small drops throughout a continuous body of non-oily medium. The proportion of dispersed oily material is in many and possibly most cases a minor one.

Oil-field emulsions containing small proportions of crude petroleum oil relatively stably dispersed in water or brine are representative oil-in-water emulsions. Other oil-in-water emulsions include: steam cylinder emulsions, in which traces of lubricating oil are found dispersed in condensed steam from steam engines and steam pumps, wax-hexane-water emulsions, encountered in de-waxing operations in oil refining; butadiene tar-in-water emulsions, encountered in the manufacture of butadiene from heavy naphtha by cracking in gas generators, and occurring particularly in the wash box waters of such systems; emulsions of "flux oil" in steam condensate produced in the catalytic dehydrogenation of butylene to produce butadiene; styrene-in-water emulsions in synthetic rubber plants; synthetic latex-in-water emulsions, found in plants producing copolymer butadiene-styrene or GRS synthetic rubber; oil-in-water emulsions occurring in the cooling water systems of gasoline absorption plants; pipe press emulsions from steam-actuated presses in clay pipe manufacture; emulsions of petroleum residues-in-diethylene glycol, in the dehydration of natural gas.

In other industries and arts, emulsions of oily materials in water or other non-oily media are encountered, for example, in sewage disposal operations, synthetic resin emulsion paint formulation, milk and mayonnaise processing, marine ballast water disposal, and furniture polish formulation. In cleaning the equipment used in processing such products, diluted oil-in-water emulsions are inadvertently, incidentally, or accidentally produced. The disposal of aqueous wastes is, in general, hampered by the presence of oil-in-water emulsions.

Essential oils comprise non-saponifiable materials like terpenes, lactones, and alcohols. They also contain saponifiable esters or mixtures of saponifiable and non-saponifiable materials. Steam distillation and other production procedures sometimes cause oil-in-water emulsions to be produced, from which the valuable essential oils are difficultly recoverable.

In all such examples, a non-aqueous or oily material is emulsified in an aqueous or non-oily material with which it is naturally immiscible. The term "oil" is used herein to cover broadly the water-immiscible materials present as dispersed particles in such systems. The non-oily phase obviously includes diethylene glycol, aqueous solutions, and other non-oily media in addition to water itself.

The foregoing examples illustrate the fact that, within the broad genus of oil-in-water emulsions, there are at least three important sub-genera. In these, the dispersed oily material is respectively non-saponifiable, saponifiable, and a mixture of non-saponifiable and saponifiable materials. Among the most important emulsions of non-saponifiable material in water are petroleum oil-in-water emulsions. Saponifiable oil-in-water emulsions have dispersed phases comprising, for example, saponifiable oils and fats and fatty acids, saponifiable oily or fatty esters, and the organic components of such esters to the extent such components are immiscible with aqueous media. Emulsions produced from certain blended lubricating compositions containing both mineral and fatty oil ingredients are examples of the third sub-genus.

Oil-in-water emulsions contain widely different proportions of dispersed phase. Where the emulsion is a waste product resulting from water flushing of manufacturing areas or equipment, the oil content may be only a few parts per million. Resin emulsion paints, as produced, contain a major proportion of dispersed phase. Naturally-occurring oil-field emulsions of the oil-in-water class carry crude oil in proportions varying from a few parts per million to about 20%, or higher in certain cases.

This phase of the present invention is concerned with the resolution of those emulsions of the oil-in-water class which contain a minor proportion of dispersed phase, ranging, for example, from 20% or higher down to 50 parts per million or less.

Although the present process relates to emulsions containing for example as much as 20% or more dispersed oily material, many if not most of them contain appreciably less than this proportion of dispersed phase. In fact, most of the emulsions encountered in the development of this invention have contained about 1% or less of dispersed phase. It is to such oil-in-water emulsions having dispersed phase volumes of the order of 1% or less to which the present process is particularly directed. This does not means that any sharp line of demarcation exists and that, for example, an emulsion containing 1.0% of dispersed phase will respond to the process, whereas one containing 1.1% of the same dispersed phase will remain unaffected; but that, in general, dispersed phase proportions of the order of 1% or less appear most favorable for application of the present process.

In emulsions having high proportions of dispersed phase, appreciable amount of some emulsifying agent are probably present, to account for their stability. In the case of more dilute emulsions, containing 1% or less of dispersed phase, there may be difficulty in accounting for their stability on the basis of the presence of an emulsifying agent in the conventional sense. For example, steam condensate frequently contains very small proportions of refined petroleum lubricating oil in extremely stable dispersion; yet neither the steam condensate nor the refined hydrocarbon oil would appear to contain anything suitable to stabilize the emulsion. In such cases, emulsion stability must probably be predicated on some basis other than the presence of an emulsifying agent.

The present process is not believed to depend for its effectiveness on the application of any simple laws, because it has a high level of effectiveness when used to resolve emulsions of widely different composition, e.g., crude or refined petroleum in water or diethylene glycol, as well as emulsions of oily materials like animal or vegetable oils or synthetic oily materials in water.

Some emulsions are by-products of manufacturing procedures in which the composition of the emulsion is known. In many instances, however, the emulsions to be resolved are either naturally-occurring or are accidentally or unintentionally produced; or in any event they do not result from a deliberate or premeditated emulsification procedure. In numerous instances, the emulsifying agent is unknown and as a matter of fact an emulsifying agent, in the conventional sense, may be felt to be absent. It is obviously very difficult or even impossible to recommend a resolution procedure for the treatment of such latter emulsions, on the basis of theoretical knowledge. Many of the most important applications of the present process are concerned with the resolution of emulsions which are either naturally-occurring or are accidentally, unintentionally, or unavoidably produced. Such emulsions are commonly of the most dilute type, containing about 1% or less of dispersed phase, although higher concentrations are often encountered.

The process which constitutes this phase of the present invention consists in subjecting an emulsion of the oil-in-water class to the action of a demulsifier of the kind described, thereby causing the oil particles in the emulsion to coalesce sufficiently to rise to the surface of the non-oily layer (or settle to the bottom, if the oil density is greater) when the mixture is allowed to stand in the quiescent state after treatment with the reagent or demulsifier.

Applicability of the present process can be readily determined by direct trial on any emulsion, without reference to theoretical considerations. This fact facilitates its application to naturally-occurring emulsions, and to emulsions accidentally, unintentionally, or unavoidably produced; since no laboratory experimentation, to discover the nature of the emulsion components or of the emulsifying agent, is required.

These reagents are useful in undiluted form or diluted with any suitable solvent. Water is commonly found to be a highly satisfactory solvent, because of its ready availability and negligible cost; but in some cases, non-aqueous solvents such as an aromatic petroleum solvent may be found preferable. The products themselves may exhibit solubilities ranging from rather modest water-dispersibility to full and complete dispersibility in that solvent. Because of the small proportions in which our reagents are customarily employed in practicing our process, apparent solubility in bulk has little significance. In the extremely low concentrations of use they undoubtedly exhibit appreciable water-solubility or water-dispersibility as well as oil-solubility or oil-dispersibility.

These reagents may be employed alone, or they may in some instances be employed to advantage admixed with other and compatible oil-in-water demulsifiers.

This process is commonly practiced simply by introducing small proportions of our reagent into an oil-in-water class emulsion, agitating to secure distribution of the reagent and incipient coalescence, and letting stand until the oil phase separates. The proportion of reagent required will vary with the character of the emulsion to be resolved. Ordinarily, proportions of reagent required are from 1/10,000 to 1/1,000,000 by volume of emulsion treated; but preferably is 5–50 p.p.m. More reagent is sometimes required. We have found that the factors, reagent feed rate, agitation, and settling time are somewhat interrelated. For example, we have found that if sufficient agitation or proper character is employed, the settling time is shortened materially. On the other hand, if satisfactory agitation is not available, but extended settling time is, the process is equally productive of satisfactory results.

Agitation may be achieved by any available means. In many cases, it is sufficient to introduce the reagent into the emulsion and use the agitation produced as the latter flows through a conduit or pipe. In some cases, agitation and mixing are achieved by stirring together or shaking together the emulsion and reagent. In some instances, distinctly improved results are obtained by the use of air or other gaseous medium. Where the volume of gas employed is relatively small and the conditions of its introduction relatively mild, it behaves as a means of securing ordinary agitation. Where aeration is effected by introducing a gas directly under pressure or from porous plates or by means of aeration cells, the effect is often importantly improved. A sub-aeration type flotation cell, of the kind commonly employed in ore beneficiation operations, is an extremely useful adjunct in the application of our reagents to many emulsions. It frequently accelerates the separation of the emulsion, reduces reagent requirements, or produces an improved effluent. Sometimes all three improvements are observable.

Heat is ordinarily of little importance in resolving oil-in-water class emulsions with out reagents although there are some instances where heat is a useful adjunct. This is especially true where the viscosity of the continuous phase of the emulsion is appreciably higher than that of water.

In some instances, importantly improved results are obtained by adjusting the pH of the emulsion to be treated to an experimentally determined optimum value.

The reagent feed rate also has an optimum range, which is sufficiently wide, however, to meet the tolerances required for the varainces encountered daily in commercial operations. A large excess of reagent can produce distinctly unfavorable results.

Our reagents have likewise been successfully applied to other oil-in-water class emulsions, of which representative examples have been referred to above. Their use is, therefore, not limited to crude petroleum-in-water emulsion.

The manner of practicing the present invention is clear from the foregoing description. However, for completeness the following examples are included.

*Example 1*

A natural crude petroleum oil-in-water emulsion from the Coalinga oil field in the San Joaquin Valley in Southern California is subjected to the action of reagents 20–$O_1$HK introduced into the emulsion at a ratio of one part to 10,000 parts emulsion and agitated for two minutes at 150 shakes per minute. Immediately after agitation the bottles containing the treated emulsion are placed in a 160° F. bath for a period of quiescence simulating the field practice for treating this particular emulsion. Several hours settling at 160° F. produces separation of dispersed oil from the water phase, leaving the water layer clear and transparent. Emulsion treated in a similar manner, but without the demulsifier, failed to separate oil.

Similar results are obtained by treating portions of the same emulsion with reagents from the following table.

*Example 2*

A natural crude petroleum emulsion from the Navaujal lease at Porca in Southern California is created in a similar manner as in Example 1 with the reagent $26-O_5AKX$. It is noted that this reagent at an optimum ratio of 1 part reagent to 25,000 parts emulsion produces separation of the dispersed oil from the water, leaving the water clear and transparent, while a blank without reagent failed to separate any oil. Other examples of reagents from the following table give similar results.

OIL-IN-WATER DEMULSIFIERS

| | |
|---|---|
| $3-A_4$ | $12-A_2O_2K$ |
| $6-A_4$ | $26-O_5AK$ |
| $10-A_2$ | $20-O_1HK$ |
| $12-A_2$ | $8-A_1KX$ |
| $15-O_1$ | $19-O_2KX$ |
| $20-O_1$ | $12-A_2O_2KX$ |
| $26-O_2$ | $26-O_5AKX$ |
| $6-A_4O$ | $20-O_1HKX$ |
| $12-A_2O_1$ | $5-K_4A$ |
| $15-O_3A$ | $6-A_4KA$ |
| $22-O_5A$ | $2-O_1KA$ |
| $23-O_2A$ | $1-O_2HKA$ |
| $17-O_1H$ | $5-U_2$ |
| $19-O_3H$ | $6-U_2$ |
| $22-O_5H$ | $5-C_1$ |
| $5-K_2$ | $26-O_1AC$ |
| $8-A_1K$ | $5-K_2C$ |
| $19-O_2K$ | |

OIL-IN-WATER DEMULSIFIERS

| | |
|---|---|
| Polyethyleneimine, molecular wt. | 900 |
| Do | 5,000 |
| Do | 11,500 |
| Do | 20,000 |
| Do | 35,000 |
| Do | 50,000 |
| Do | 100,000 |
| Polypropyleneimine, molecular wt. | 500 |
| Do | 1,000 |
| Do | 5,000 |
| Do | 10,000 |
| Do | 20,000 |
| Do | 40,000 |

| | |
|---|---|
| $19-A_3$ | $20-A_1O_2HK$ |
| $20-A_1$ | $12-K_1A$ |
| $58-O_1$ | $15-A_2O_4KA-$ |
| $59-O_1$ | $46-O_3HKA$ |
| $61-O_4$ | $20-A_1O_2HKA$ |
| $18-A_3O_1$ | $10-U_1$ |
| $44-O_5A$ | $11-U_3$ |
| $36-O_3H$ | $12-U_2$ |
| $17-A_3O_2H$ | $11-C_2$ |
| $11-K_2$ | $12-C_3$ |
| $12-K_3$ | $15-A_3C$ |
| $19-A_2K$ | $28-O_2C$ |
| $51-O_2K$ | $8-K_4C$ |
| $19-A_3O_3K$ | $61-O_2KAC$ |

ACIDIZATION OF CALCAREOUS STRUCTURES

This phase of our invention relates to the use of the compounds of our invention in preventing the formation of emulsions in the acidization of oil-bearing, calcareous strata, or the like. The conventional acidization process comprises introducing a strong mineral acid into an oil well for the purpose of causing the acid to disintegrate, dissolve, or react with the calcareous, oil-bearing structure of the well, in a manner that results in an increase in the amount of crude petroleum obtained from the oil-bearing strata. In this phase of our invention the present compounds are introduced with the strong mineral acid.

Many oil wells, after being subjected to acidization, produce emulsions, frequently of a very refractory nature, that have to be demulsified or subjected to chemical, electrical or similar treatment, in order to recover the oil or valuable constituent of the emulsion. Our compositions prevent the formation of objectionable water-in-oil type emulsions resulting from acidization of oil wells, or stated in another way, provide a means by which the oil-bearing, calcareous structure of a well can be acidized to increase the oil production, without danger of the procedure causing the well to produce a product, which, after being discharged from the well, has to be treated with a demulsifying agent, or subjected to other treatment of the kind commonly employed for converting refractory petroleum emulsions into oil that can be sold to pipelines and refineries. Such refractory emulsions, which often follow conventional acidization, represent a transitory, rather than a permanent, situation, but even if lasting only for a few weeks, are extremely objectionable. The new compositions of this invention are adapted for use in acidizing the calcareous, oil-bearing strata of a well, inasmuch as the acid component will react with or act upon the calcareous structure in a way to increase the amount of crude petroleum obtainable from said structure, without, however, converting said crude petroleum into an objectionable emulsion.

In practicing our process, the said emulsion-preventing agent is caused to act upon or come in contact with the fluids, liquids, or liquid mixture in a well that has been subjected to acidization, either while said fluids or liquids are at the bottom of the well, or while said fluids or liquids are traveling upwardly to the surface of the ground, but the particular procedure, the means used to effect the mixing, or commingling of said emulsion-preventing agent with the well fluids or liquids, and the particular time when said mixing is effected, are immaterial, so long as said emulsion-preventing agent becomes mixed with, dissolved in, or commingled with the fluids of the well or the liquids or liquid mixture resulting from the acidization operation (the oil and the reaction product of the mineral acid on the calcareous structure), prior to emergence from the well. Equally good results may be obtained by the following procedure, to wit·

(a) Introducing the emulsion-preventing agent, preferably in aqueous solution, prior to the introduction of the mineral acid into the well;

(b) Introducing the emulsion-preventing agent, along with the mineral acid, i.e., dissolved in said acid; and (c) Introducing the emulsion-preventing agent, preferably in aqueous solution, immediately after the introduction of the mineral acid.

The composition of matter that we have devised for acidizing the calcareous, oil-bearing structure of oil wells, consists of the emulsion-preventing agent above described, mixed with, dissolved in, or combined with strong mineral acid, such as hydrochloric acid, nitric acid, sulfuric acid, sulfamic acid, or mixtures of the same. Our preference is to use hydrochloric acid, whose concentration is at least equal to approximately half strength commercial 18° Baumé acid, as we have found that when such an acid is mixed with approximately 0.01% to 2.5% by weight based on the weight of the acid of the herein contemplated emulsion-preventing agent or agents, one obtains a new composition of matter that is perfectly stable and homogeneous, and which exhibits unusual properties, particularly when said new composition of matter is employed in the acidization of oil-bearing strata. However, we wish it to be understood that this phase of our invention, i.e., the new process and composition of matter herein described, is not restricted to the use of hydrochloric acid, but instead, contemplates the use of any suitable "strong mineral acid", several of which have previously been described as being usable in place of hydrochloric acid.

A number of problems have been involved in the introduction of strong mineral acid into oil-bearing strata of the kind containing calcium carbonate, magnesium carbonate, mixtures of the same, siliceous material, or material which is dolomitic in character, and commonly referred to as calcareous structures. One problem is the prevention of corrosion, or damage, to the metallic working parts of the well into which the acid is introduced. This has been overcome in various ways, such as by the use of an inhibitor. The compositions of this invention also act as corrosion inhibitors. For the sake of brevity, reference is made to the following patents, which gave a cross-sectional view of the art relating to acidization, although there are in addition certain other practical elements which are well known.

U.S. Patents Nos. 1,877,504, September 13, 1932, Grebe and Sanford; 1,891,667, December 20, 1932, Carr; 1,911,446, May 20, 1933, Grebe and Sanford; 1,990,960, February 12, 1935, Wilson; 2,011,579, August 20, 1935, Health and Fry; 2,024,718, December 17, 1935, Chamberlain; 2,038,956, April 28, 1936, Parkhurst; 2,053,285, September 8, 1936, Grebe; 2,128,160, August 23, 1938, Morgan; 2,128,161, August 23, 1938, Morgan; and 2,161,085, June 6, 1939, Phalen.

As has been previously stated, in the acidization of oil-bearing, calcareous strata, or the like, it has been found necessary, in some instances, to add certain other materials or compounds which given additional desirable effects, at least under certain conditions. For instance, hydrofluoric acid or fluorides have been added to intensify the action of the hydrochloric acid used to treat the well. Possibly this is related to the action on siliceous matter in the calcareous structure. The reason for the addition of inhibitors has been previously indicated. Sometimes it has been found desirable to add tenacious, foam-producing agents, such as glue, gelating, or the like. In other instances, it has been found desirable to add calcium sequestering compounds, such as sodium hexametaphosphate. In other instances, reducing agents have been added to keep any dissolved iron salts in the ferrous state. Isopropyl alcohol, or the like, is sometimes added as a surface tension depressant. Thus, the addition of various other auxiliary agents, commonly referred to as addition agents, is well known.

For the sake of brevity, reference will be made to hydrochloric acid as illustrating any suitable mineral acid. It is understood, of course, that such hydrochloric acid may or may not contain various amounts of hydrofluoric acid.

As previously indicated, the emulsion-preventing agents herein described have the effect of preventing emulsions when an oil well is turned into production after the acidizing operation. Many oil wells are acidized without subsequently producing any emulsions; or the emulsions, if produced, are self-resolving, or readily susceptible to any moderate breaking action. However, certain wells, particularly those located in western Kansas and certain wells in Illinois, when acidized by conventional processes, yield particularly refractory emulsions. This is a rather surprising situation, insofar that the spent acid results in a solution having approximately 20% of calcium chloride present, and having a pH value of approximately 3.5 to 5. One would expect the increased acidity over that of most natural brines to decrease the stability of the emulsion. One would also expect that the increased electrolyte content of the dispersed phase would decrease the stability of the emulsion. The increased specific gravity differential should have a similar destabilizing effect. Actually, in a number of instances, this is not the case, and such emulsions have resulted in unusual problems. In its broadest aspect, then, the agents herein contemplated may be used simply as emulsion-preventers, in connection with the acidization of subterranean strata.

The most concentrated hydrochloric acid, ordinarily available, is about 36% HCl strength. The commercial acid of this strength, or somewhat weaker, is usually diluted with an equal quantity of water before it is used for acidization; i.e., the acid used in acidization may vary from 14% to 16.5% HCl, although acid varying in strength from 5% to 20% HCl has been employed. It is entirely feasible to add an agent to the acid, as produced at the point of manufacture, thus exemplifying the composition of matter feature of the present invention. For instance, if desired, 0.02% to 5% by weight of the contemplated agent may be added to the concentrated hydrochloric acid at the point of manufacture. Such acid can be diluted to a suitable point before being employed in the acidization process. Thus, even concentrated acid can be diluted, for instance, half and half, so that the reagent is present in the dilute product within the ratio suggested previously, to wit, 0.01% to 2.5% by weight. In many instances, the use of between 0.05% and 0.5% represents an acceptable average range.

In actual practice the hydrochloric acid obtained by a person or firm responsible for acidization operations may be used, in some instances, on oil-bearing strata which do not form severe or refractory emulsions and thus no advantage is obtained by adding a composition of the kind herein contemplated in comparison with ordinary acid. Then too, some calcareous, oil-bearing strata which produces severe emulsions may require more or less of the agent of the kind herein contemplated than would be necessary in some other strata. For this reason, in the practical aspect it is generally desirable to add the agent of the kind herein contemplated to the dilute acid, so as to be suitable for the specific local conditions which require treatment. The suitable range of ratios for ordinary half-strength acids has been indicated.

As has been previously suggested, one may also add to the acid intended for acidization various other reagents or addition products of the kind described in the aforementioned list of patents without affecting the operation of the emulsion-preventing agent that we employ and without danger of said emulsion-preventing agent interfering with the effectiveness of such other acidization addition products. Likewise, it has been indicated that one need not necessarily employ our emulsion-preventing agent in the form of an addition agent which is added to or mixed with the acid used in the acidizing step. Instead, our emulsion-preventing agent may be introduced in suitable aqueous solution, preferably in fairly concentrated solution, for instance, 1–5%, prior to the acidizing step or immediately after the acidizing step. The method of introduction is, of course, any conventional method and preferably employs the same apparatus and procedure used for introducing the acid. For convenience, however, and in the most preferred form, our process is exemplified by employing, as an integral part thereof, the composition of matter herein contemplated, to wit, hydrochloric acid, or the like, containing, in stable admixture, agents of the kind described.

The ineffectiveness of most ordinary demulsifiers for preventing the formation of water-in-oil type emulsions resulting from acidization is readily understable. Ordinary demulsifiers either are not soluble in half-strength hydrochloric acid, or its equivalent, or they are not soluble in spent brine of the kind previously mentioned, i.e., brine containing, roughly, equivalent to 20% of calcium chloride, and having a pH of 3.5 to 5. Furthermore, if soluble at all, they are generally decomposed; and if they do not decompose under ordinary conditions, they at least decompose under the conditions which involve the necessary pressure employed in acidization. Then too, in some instances where such demulsifiers appear to meet all other requirements, they apparently precipitate out on the face of the pay sand or oil-bearing strata, and they may even reduce instead of increase the oil production, as compared with results obtained by ordinary acid. There are a number of other reasons not necessary to explain which prevent ordinary demulsifiers from being effective.

Many of the compounds of this invention are water-soluble. For that reason they can be used without difficulty in aqueous solution as an emulsion-preventing agent by injecting such aqueous solution into the oil-bearing strata prior to acidization or immediately after acidization. Such injection is made by conventional means as, for example, the same apparatus or mechanical device employed for injecting acid into the well or oil-bearing strata. Furthermore, substantially all of the compounds of this invention are soluble in hydrochloric acid of a strength corresponding to approximately 15%. Substantially all of the compounds of the type indicated are soluble in concentrated hydrochloric acid. Commercial hydrochloric acid is ordinarily available in grades from approximately 18° Baumé, corresponding to approximately 28% anhydrous acid, to 22° Baumé, corresponding to approximately 35.2% anhydrous acid. Some commercial hydrochloric acid is available in a strength which approximates the C. P. grade, or slightly less than 37% anhydrous acid.

Needless to say, solutions of our compositions of matter can be prepared readily in any convenient manner. The selected compound can be dissolved in concentrated hydrochloric acid without dilution. The percentages employed have already been indicated. Such a concentrated hydrochloric acid may or may not contain some hydrofluoric acid. Likewise, if desired, the emulsion-preventing agent can be dissolved in water, and such aqueous solution added to the hydrochloric acid or the like in order to dilute the same to the desired concentration. Another procedure, of course, is to dilute the hydrochloric acid to the desired concentration and add the particular chemical compound which has been selected as the emulsion-preventing agent. The percentage of chemical compound of the kind herein described is added within the range of 0.01% to 5% by weight based on the weight of the acid.

*Examples*

The following test, which is a severe test for acidizing emulsions (referred to as the homogenizer test) is applied to the compounds of this invention.

Aqueous hydrochloric acid (15%) in the amount of 50 ml. is placed in a beaker. A compound selected from the table below is mixed into the acid in an amount of 0.3% by weight based on the weight of acid. Crude oil (50 ml.) is added and the mixture is then placed in a pneumatic homogenizer. This mixture is pressured through a homogenizing nozzle and the emulsion is caught in a graduate beaker. A second pass through the homogenizer is made. The resulting emulsion is caught in a graduate and the volume of acid settled is noted as a function of time. Normally, any acid that is not separated in 10 to 15 minutes will not separate. With the compound shown in the following table, substantially all of the acid separates out within 15 minutes.

AGENTS FOR THE ACIDIZATION OF CALCAREOUS STRUCTURES

Polyethyleneimine, molecular weight of 900.
Polyethyleneimine, molecular weight of 5,000.
Polyethyleneimine, molecular weight of 11,500.
Polyethyleneimine, molecular weight of 20,000.
Polyethyleneimine, molecular weight of 50,000.
Polyethyleneimine, molecular weight of 100,000.

$1-A_7$
$2-A_4$
$4-A_3$
$6-A_4$
$8-A_3$
$13-A_2$
$1-O_5$
$2-O_3$
$3-O_1$
$10-O_2$
$11-O_3$
$14-O_6$
$15-O_5$
$17-O_1$
$22-O_1$
$1-A_5O_1$
$4-A_2O$
$1-O_1A_1$
$18-O_5A$
$25-O_3A_2$
$10-O_2H$
$22-O_5H$
$1-K_1$
$2-K_3$
$4-K_4$
$5-K_3$
$6-K_2$
$4-K_1X$
$6-K_3X$
$5-K_2A$
$5-K_3A$
$1-O_2HKA$
$1-U_3$
$2-U_2$
$4-U_3$
$5-U_2$
$6-U_1$

AGENTS FOR THE ACIDIZATION OF CALCAREOUS STRUCTURE

Polypropyleneimine, molecular weight of 500.
Polypropyleneimine, molecular weight of 1,000.
Polypropyleneimine, molecular weight of 5,000.
Polypropyleneimine, molecular weight of 10,000.
Polypropyleneimine, molecular weight of 20,000.
Polypropyleneimine, molecular weight of 40,000.

$15-A_3$
$16-A_3$
$19-A_2$
$27-O_3$
$37-O_1$
$45-O_4$
$18-A_3O_3$
$44-O_5A$
$56-O_4H$
$10-K_3$
$50-O_2K$
$20-A_1O_2HK$
$7-K_2A$
$44-O_5AKA$
$11-U_3$
$9-C_3$
$20-A_1O_2C$

Having thus described our invention, what we claim as new and desire to obtain by Letters Patent is:

1. A process of breaking, preventing, and suppressing emulsions which is chracterized by subjecting the emulsion to the action of an agent selected from the group consisting of
   (1) an olefinated linear polymer of a 1,2-alkyleneimine, said polymer having a molecular weight of at least 800, each alkylene unit therein having 2 to 20 carbon atoms, formed by reacting, at a temperature of from about 70° C. to about 100° C., said polymer with an olefinating agent selected from the group consisting of acrylonitrile, styrene, butadiene, vinyl ethers and vinyl sulfones,
   (2) a Schiff base reaction product of a linear polymer of a 1,2-alkyleneimine, said polymer having a molecular weight of at least 800, each alkylene unit therein having 2 to 20 carbon atoms, formed by reacting said polymer with a compound selected from the group consisting of aldehydes and ketones,
   (3) a Schiff base reaction product of an acylated linear polymer of a 1,2-alkyleneimine, said polymer having a molecular weight of at least 800, each alkylene unit therein having 2-20 carbon atoms, formed by reacting, at a temperature of from about 120° C. to about 300° C., said polymer with an acylating agent selected from the group consisting of (i) a carboxylic acid having 7-39 carbon atoms and (ii) a precursor of said carboxylic acid capable of forming said acid in said reaction, and then reacting said acylataed polymer with a compound selected from the group consisting of aldehydes and ketones,
   (4) a Schiff base reaction product of an alkylated linear polymer of a 1,2-alkyleneimine, said polymer having a molecular weight of at least 800, each alkylene unit therein having 2-20 carbon atoms, formed by reacting, at a temperature of from about 100° C. to about 250° C., said polymer with a hydrocarbon halide alkylating agent having 1–30 carbon atoms, and then reacting said alkylated polymer with a compound selected from the group consisting of aldehydes and ketones, (5) an oxyalkylated Schiff base reaction product of a linear polymer of a 1,2-alkyleneimine, said linear polymer having a molecular weight of at least 800, each alkylene unit therein having 2–20 carbon atoms formed by reacting said linear polymer with a compound selected from the group consisting of aldehydes and ketones to form said Schiff base reaction product and then reacting said Schiff base reaction product, at a temperature of from about 80° C. to about 200° C. and a pressure of from about 10 p.s.i. to about 200 p.s.i., with an alkylene oxide having at least 2 carbon atoms, (6) an acylated, then olefinated linear polymer of a 1,2-alkyleneimine, said polymer having a molecular weight of at least 800, each alkylene unit therein having 2–20 carbon atoms, formed by reacting, at a temperature of from about 120° C. to about 300° C., said linear polymer with an acylating agent selected from the group consisting of (i) a carboxylic acid having 7–39 carbon atoms and (ii) a precursor of said carboxylic acid capable of forming said acid in said reaction, and then reacting said acylated polymer, at a temperature of from about 70° C. to about 100° C., with an olefinating agent selected from the group consisting of acrylonitrile, styrene, butadiene, vinyl ethers and vinyl sulfones, and (7) an alkylated, then olefinated linear polymer of a 1,2-alkyleneimine, said polymer having a molecular weight of at least 800, each alkylene unit therein having 2–20 carbon atoms, formed by reacting, at a temperature of from about 100° C. to about 250° C., said polymer with a hydrocarbon halide alkylating agent having from 1–30 carbon atoms, and then reacting said alkylated polymer, at a temperature of from about 70° C. to about 100° C., with an olefinating agent selected from the group consisting of acrylonitrile, styrene, butadiene, vinyl ethers and vinyl sulfones.

2. The process of claim 1 wherein the compound is an olefinated linear polymer of a 1,2-alkyleneimine, said polymer having a molecular weight of at least 800, each alkylene unit therein having 2 to 20 carbon atoms, formed by reacting, at a temperature of from about 70° C. to about 100° C., said polymer with an olefinating agent selected from the group consisting of acrylonitrile, styrene, butadiene, vinyl ethers and vinyl sulfones.

3. The process of claim 1 wherein the compound is a Schiff base reaction product of a linear polymer of a 1,2-alkyleneimine, said polymer having a molecular weight of at least 800, each alkylene unit therein having 2 to 20 carbon atoms, formed by reacting said polymer with a compound selected from the group consisting of aldehydes and ketones.

4. The process of claim 1 wherein the linear polymer of a 1,2-alkyleneimine is polyethyleneimine.

5. The process of claim 2 wherein the linear polymer of a 1,2-alkyleneimine is polyethyleneimine.

6. The process of claim 3 wherein the linear polymer of a 1,2-alkyleneimine is polyethyleneimine.

References Cited

UNITED STATES PATENTS

| | | | |
|---|---|---|---|
| 2,243,329 | 5/1941 | De Groote et al. | 252—344 |
| 2,250,176 | 7/1941 | Blair | 252—344 |
| 2,272,489 | 2/1942 | Ulrich | 260—239 |
| 2,292,208 | 8/1942 | De Groote et al. | 252—344 |
| 2,552,534 | 5/1951 | De Groote | 252—344 |
| 2,589,198 | 5/1951 | Monson | 252—344 |
| 2,615,853 | 10/1952 | Kirkpatrick et al. | 252—331 |
| 2,995,512 | 10/1961 | Weidner et al. | 252—344 |

OTHER REFERENCES

Schwartz-Perry, Surface Active Agents, pub. 1949 by Interscience Publishers of New York, p. 173.

LEON D. ROSDOL, *Primary Examiner.*

H. B. GUYNN, *Assistant Examiner.*